US010230841B2

(12) United States Patent
Rauenbuehler et al.

(10) Patent No.: US 10,230,841 B2
(45) Date of Patent: Mar. 12, 2019

(54) INTELLIGENT DIGITAL ASSISTANT FOR DECLINING AN INCOMING CALL

(71) Applicant: Apple Inc., Cupertino, CA (US)

(72) Inventors: Keith W. Rauenbuehler, San Francisco, CA (US); Ryan A. Williams, Pickering (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/789,570

(22) Filed: Oct. 20, 2017

(65) Prior Publication Data

US 2018/0146089 A1     May 24, 2018

Related U.S. Application Data

(60) Provisional application No. 62/425,511, filed on Nov. 22, 2016.

(51) Int. Cl.

| H04M 3/42 | (2006.01) |
|---|---|
| H04M 1/725 | (2006.01) |
| H04M 3/436 | (2006.01) |
| H04M 1/60 | (2006.01) |
| H04M 1/64 | (2006.01) |

(52) U.S. Cl.
CPC ... *H04M 3/42365* (2013.01); *H04M 1/72583* (2013.01); *H04M 3/42059* (2013.01); *H04M 3/436* (2013.01); *H04M 1/6091* (2013.01); *H04M 1/64* (2013.01); *H04M 1/72566* (2013.01); *H04M 1/72572* (2013.01); *H04M 3/42348* (2013.01); *H04M 2201/18* (2013.01); *H04M 2203/2072* (2013.01); *H04M 2242/28* (2013.01); *H04M 2250/74* (2013.01)

(58) Field of Classification Search
CPC ................................................. H04W 3/42365
See application file for complete search history.

(56) References Cited

U.S. PATENT DOCUMENTS

| 2003/0172067 A1* | 9/2003 | Adar ................. G06F 17/30867 |
|---|---|---|
| 2014/0134983 A1* | 5/2014 | Jung ..................... H04M 3/436 |
| | | 455/414.1 |
| 2016/0286045 A1* | 9/2016 | Shaltiel ................... H04M 3/48 |

OTHER PUBLICATIONS

Office Action received for Australian Patent Application No. 2017101584, dated Apr. 20, 2018, 4 pages.

(Continued)

*Primary Examiner* — Justin Y Lee
(74) *Attorney, Agent, or Firm* — Dentons US LLP

(57) ABSTRACT

Systems and processes for operating a digital assistant are provided. In one example, a method includes receiving an incoming call. In response to receiving the incoming call, the method further includes obtaining one or more user-specific data items. The method further includes determining one or more user status options; and determining one or more confidence values associated with the one or more user status options. The method further includes in accordance with the determination of the one or more confidence values exceeding a predetermined threshold, providing a plurality of response options associated with declining the incoming call. The method further includes receiving a selection of a response option from the plurality of response options; and declining the call based on the selected response option.

48 Claims, 28 Drawing Sheets

(56) References Cited

OTHER PUBLICATIONS

Office Action received for Australian Patent Application No. 2017101584, dated Jan. 22, 2018, 3 pages.
Office Action received for Chinese Patent Application No. 201711160847.6, dated Dec. 21, 2017, 2 pages (1 page of English Translation and 1 page of Official Copy).

* cited by examiner

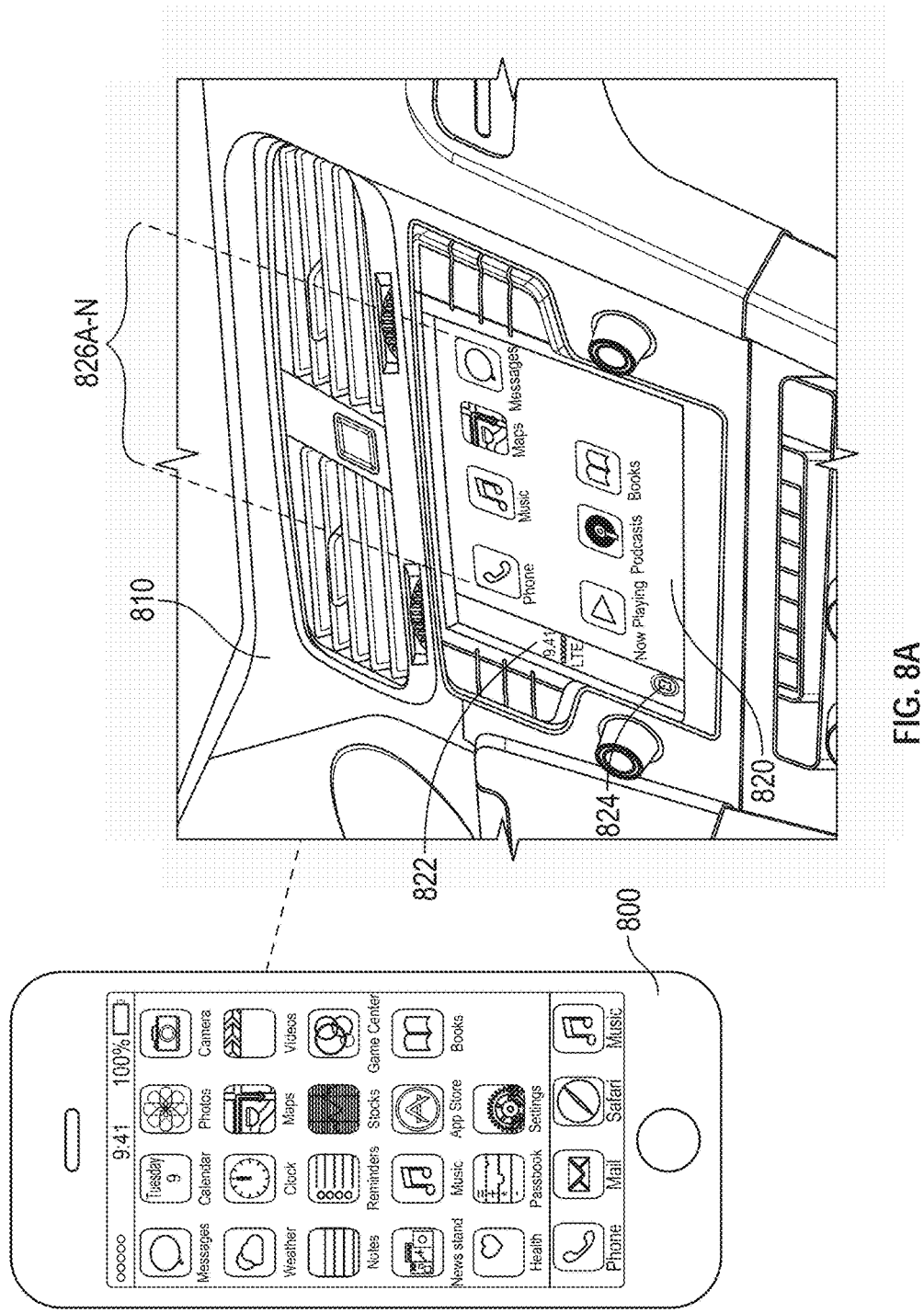

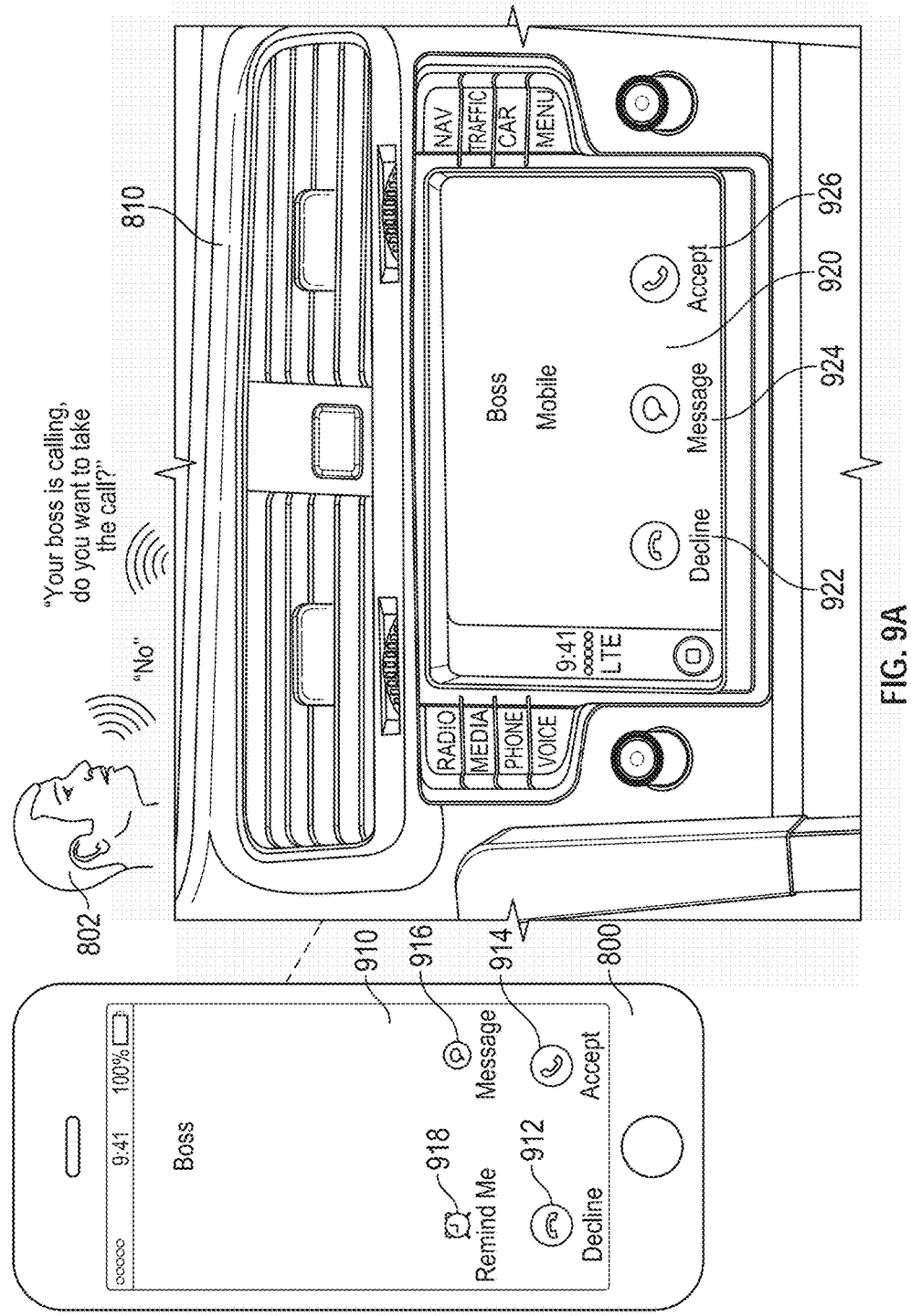

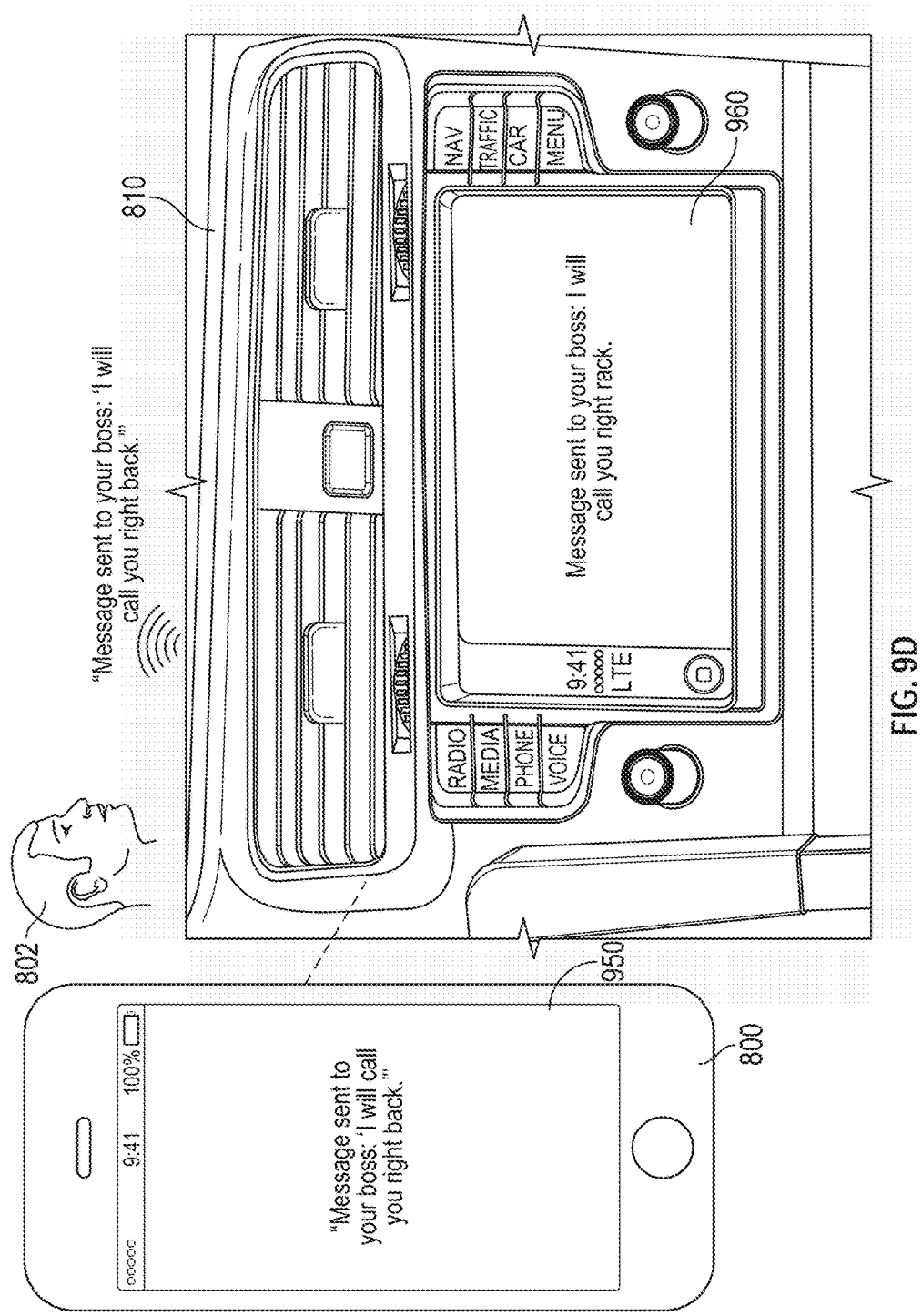

INTELLIGENT DIGITAL ASSISTANT FOR DECLINING AN INCOMING CALL

CROSS-REFERENCE TO RELATED APPLICATIONS

This application claims priority to U.S. Provisional Patent Application Ser. No. 62/425,511, filed on Nov. 22, 2016, entitled "INTELLIGENT DIGITAL ASSISTANT FOR DECLINING AN INCOMING CALL," which is hereby incorporated by reference in its entirety for all purposes.

FIELD

The present disclosure relates generally to a digital assistant and, more specifically, to a digital assistant that enables intelligent declining of an incoming call.

BACKGROUND

Smartphones are increasing popular. When a user receives a phone call, the user's smartphone typically provides options to either answer the call or decline the call. A simple declining of the call does not provide any information to the caller regarding the user's status or the reason why the user cannot answer the call. For example, the caller may not know whether the user declines the call because the user is driving, attending a meeting, or simply does not want to pick up the call. It is thus desirable for provide a digital assistant that can enable intelligent declining of an incoming call in a more informative and communicative manner.

BRIEF SUMMARY

Some existing techniques for declining an incoming call may include, for example, sending a text message to a caller indicating a reason of declining the call. Typically, a user may be required to manually compose the text message and send to the caller. Manually composing the text message may be cumbersome, difficult, and sometime impossible. For example, if a user receives a call while he or she is driving, he may not be able to compose a text message or may choose to simply declining the call without composing a text message because of safety concerns. Providing a digital assistant that can intelligently determine and provide response options for declining an incoming call is thus desirable. The response options can be determined based on user-specific data, and can be more communicative regarding the reason for declining the call.

Systems and processes for operating a digital assistant are provided. In accordance with one or more examples, a method includes, at a user device with one or more processors and memory, receiving an incoming call. The method also includes, in response to receiving the incoming call, obtaining one or more user-specific data items; and determining, based on the one or more user-specific data items, one or more user status options. The method further includes determining one or more confidence values associated with the one or more user status options. In accordance with the determination of the one or more confidence values exceeding a predetermined threshold, the method further provides a plurality of response options associated with declining the incoming call. The method further includes receiving a selection of a response option from the plurality of response options; and declining the call based on the selected response option.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE DRAWINGS

For a better understanding of the various described embodiments, reference should be made to the Detailed Description below, in conjunction with the following drawings in which the same or similar reference numerals refer to corresponding parts throughout the figures.

FIGS. 8A-8F illustrate functionalities of operating a digital assistant for intelligent declining of an incoming call according to various examples.

FIGS. 9A-9D illustrate functionalities of operating a digital assistant for intelligent declining of an incoming call according to various examples.

DETAILED DESCRIPTION

Figure 1:
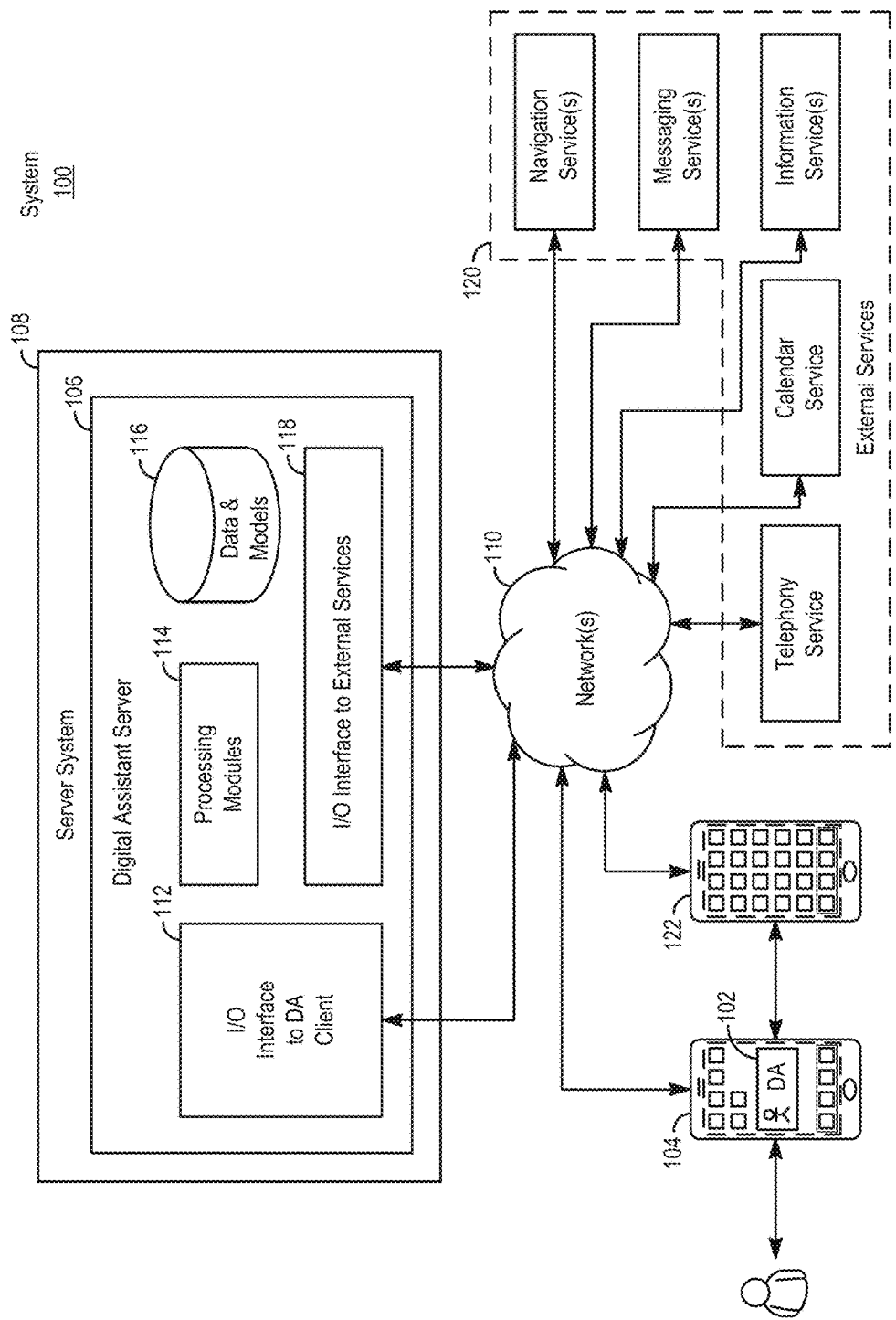
FIG. 1 is a block diagram illustrating a system and environment for implementing a digital assistant according to various examples.

In the following description of the disclosure and embodiments, reference is made to the accompanying drawings, in which it is shown by way of illustration, of specific embodiments that can be practiced. It is to be understood that other embodiments and examples can be practiced and changes can be made without departing from the scope of the disclosure.

Techniques for providing a digital assistant for intelligent declining of an incoming call are desirable. As described herein, techniques for providing a digital assistant for intelligent declining of an incoming call are desired for various purposes such as reducing the cumbersomeness of communicating the reasons for declining the call to the caller, reducing the user's manual effort composing a communication of reasons for declining the call, improving the functionality of an electronic device related to declining and managing incoming calls, and improving safety for operating an electronic device for declining an incoming call. Such techniques are advantageous by allowing the user to easily operate a digital assistant for declining an incoming call and by communicating the reasons for declining the call to the caller. For example, the digital assistant may intelligently provide several response options for declining the call and allow the user to select one response option using voice and/or tactile operations.

Although the following description uses terms "first," "second," etc. to describe various elements, these elements should not be limited by the terms. These terms are only used to distinguish one element from another. For example, a first user status option could be termed a second user status option, and, similarly, a second user status option could be termed a first user status option, without departing from the scope of the various described examples. The first user status option and the second user stats option can both be user status options and, in some cases, can be separate and different user status options.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B). A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can operate in a multi-tasking environment. A multi-tasking environment allows a user to operate device 104 to perform multiple tasks in parallel. For example, a multi-tasking environment may be a desktop or laptop environment, in which device 104 may perform one task in response to the user input received from a physical user-interface device and, in parallel, perform another task in response to the user's voice input. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoW), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-6B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
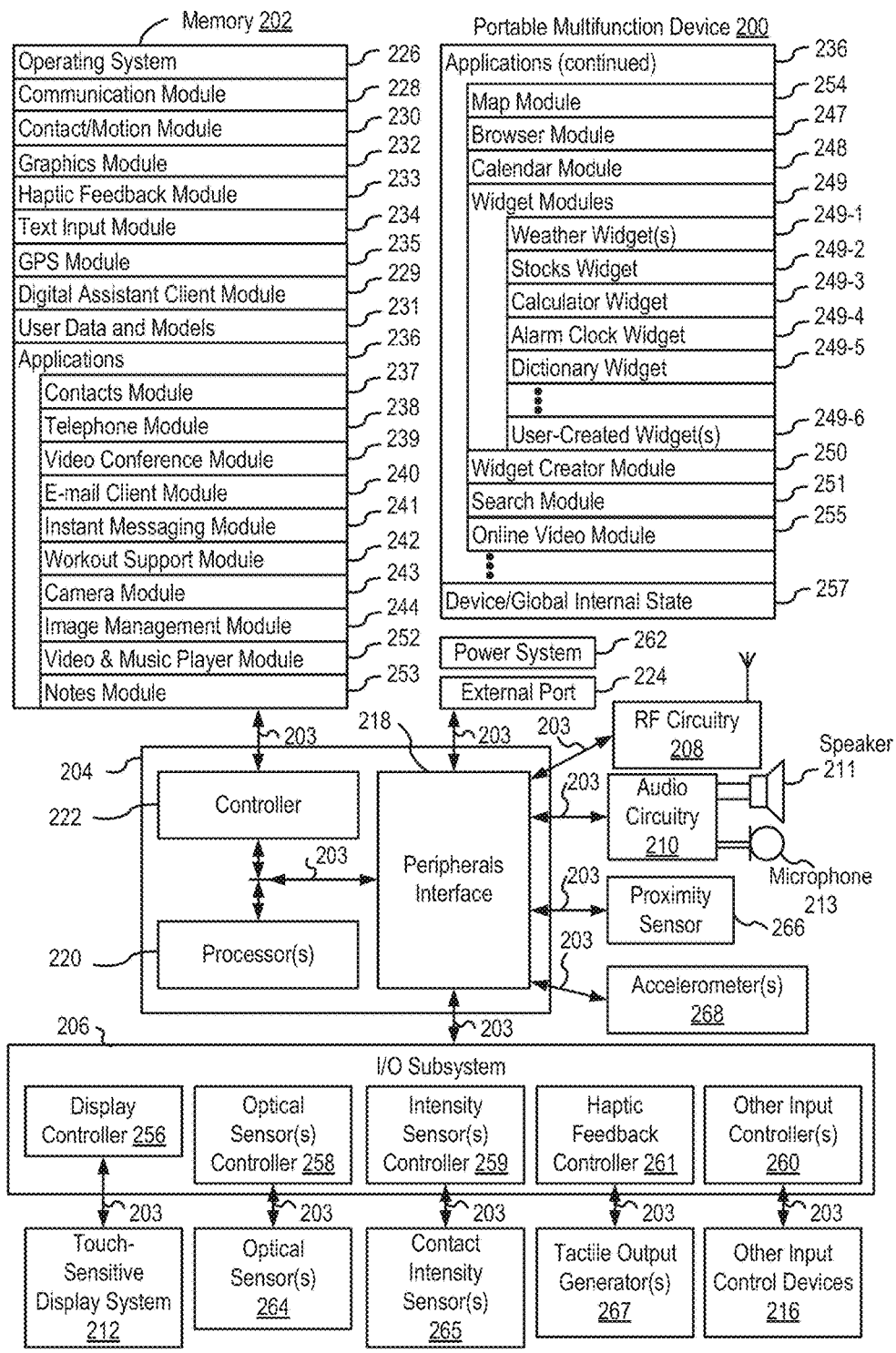
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of process 1200, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 1200, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HS- DPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoW), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user interface objects.

Touch screen 212 has a touch-sensitive surface, sensor, or set of sensors that accept input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light-emitting polymer display) technology, or LED (light-emitting diode) technology, although other display technologies may be used in other embodiments. Touch screen 212 and display controller 256 may detect contact and any movement or breaking thereof using any of a plurality of touch-sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/U.S. Pat. No. 0,015,024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery or alternating current (AC)), a recharging system, a power failure detection circuit, a power converter or inverter, a power status indicator (e.g., a light-emitting diode) and any other components associated with the generation, management, and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device, so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
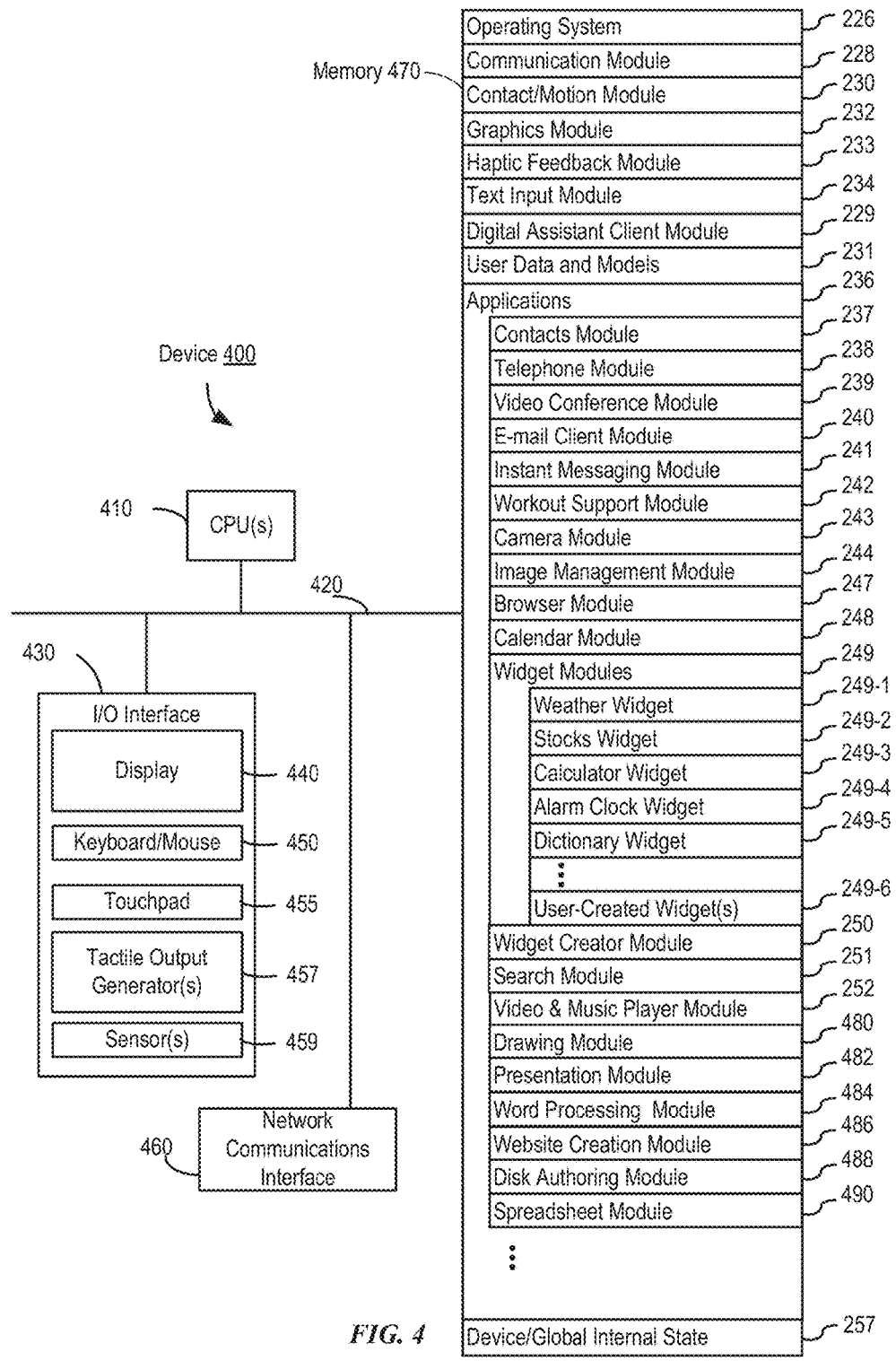
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views, or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200.

Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);
Telephone module 238;
Video conference module 239;
Email client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
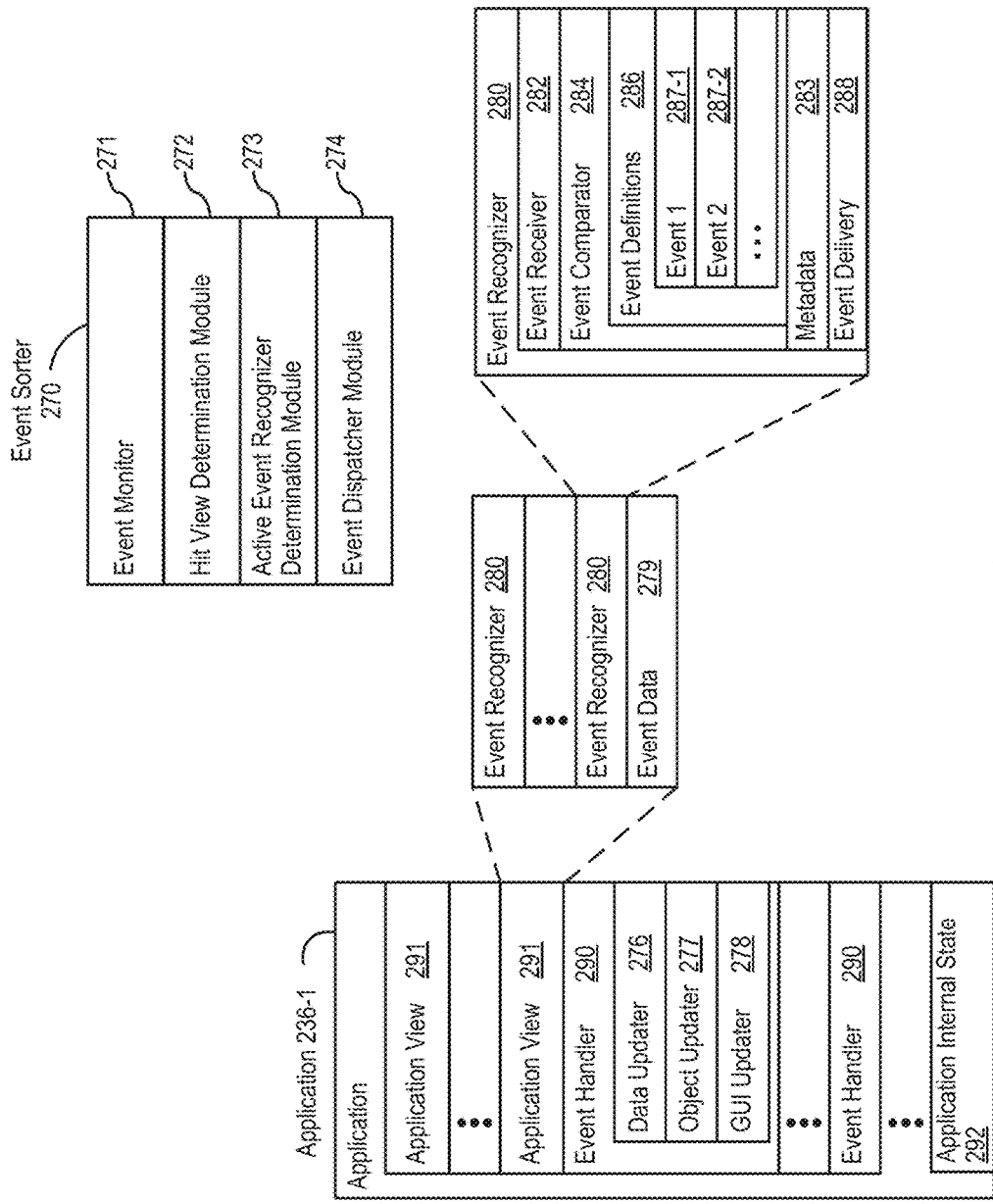
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283 and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
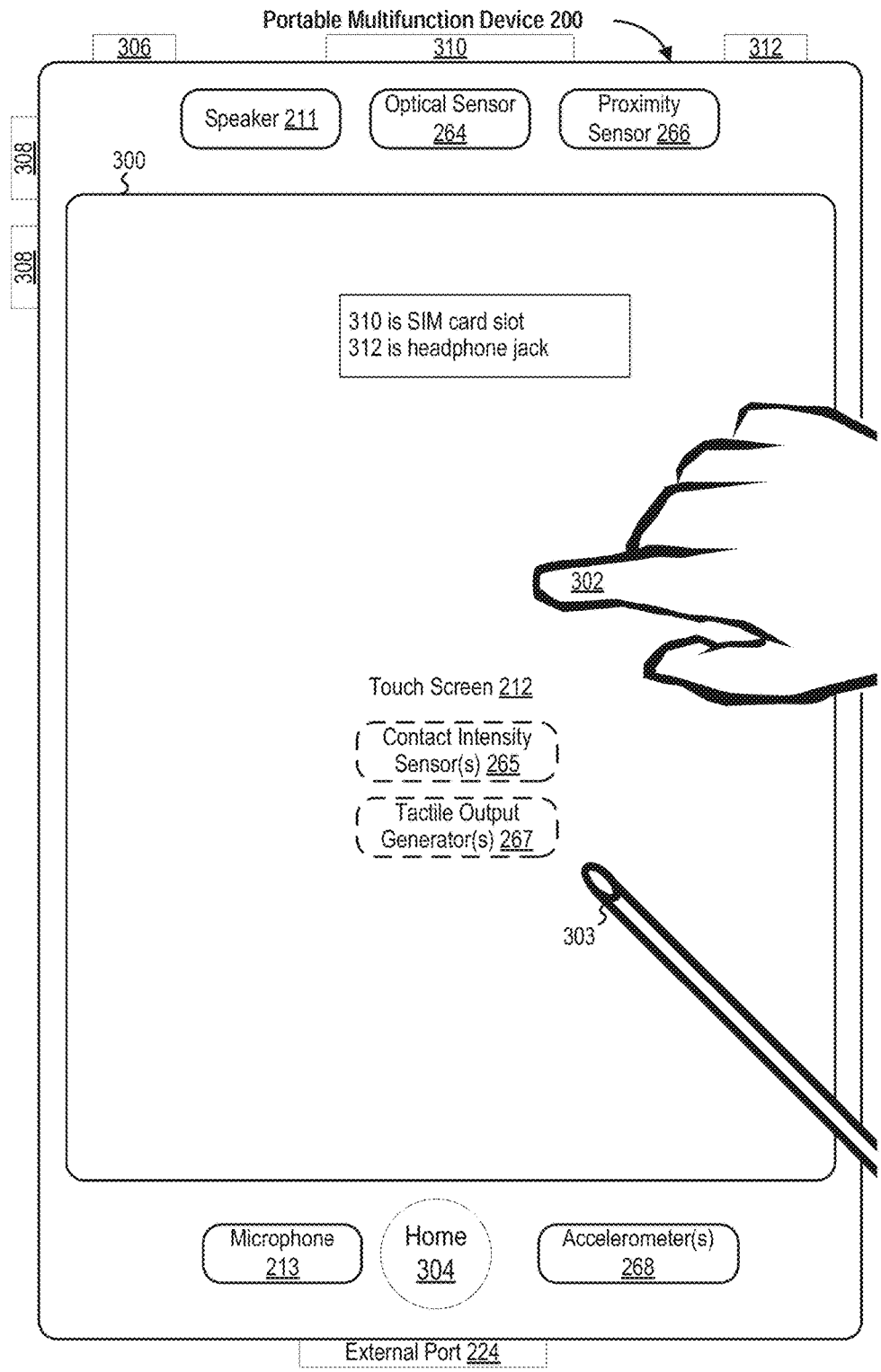
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward, and/or downward), and/or a rolling of a finger (from right to left, left to right, upward, and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
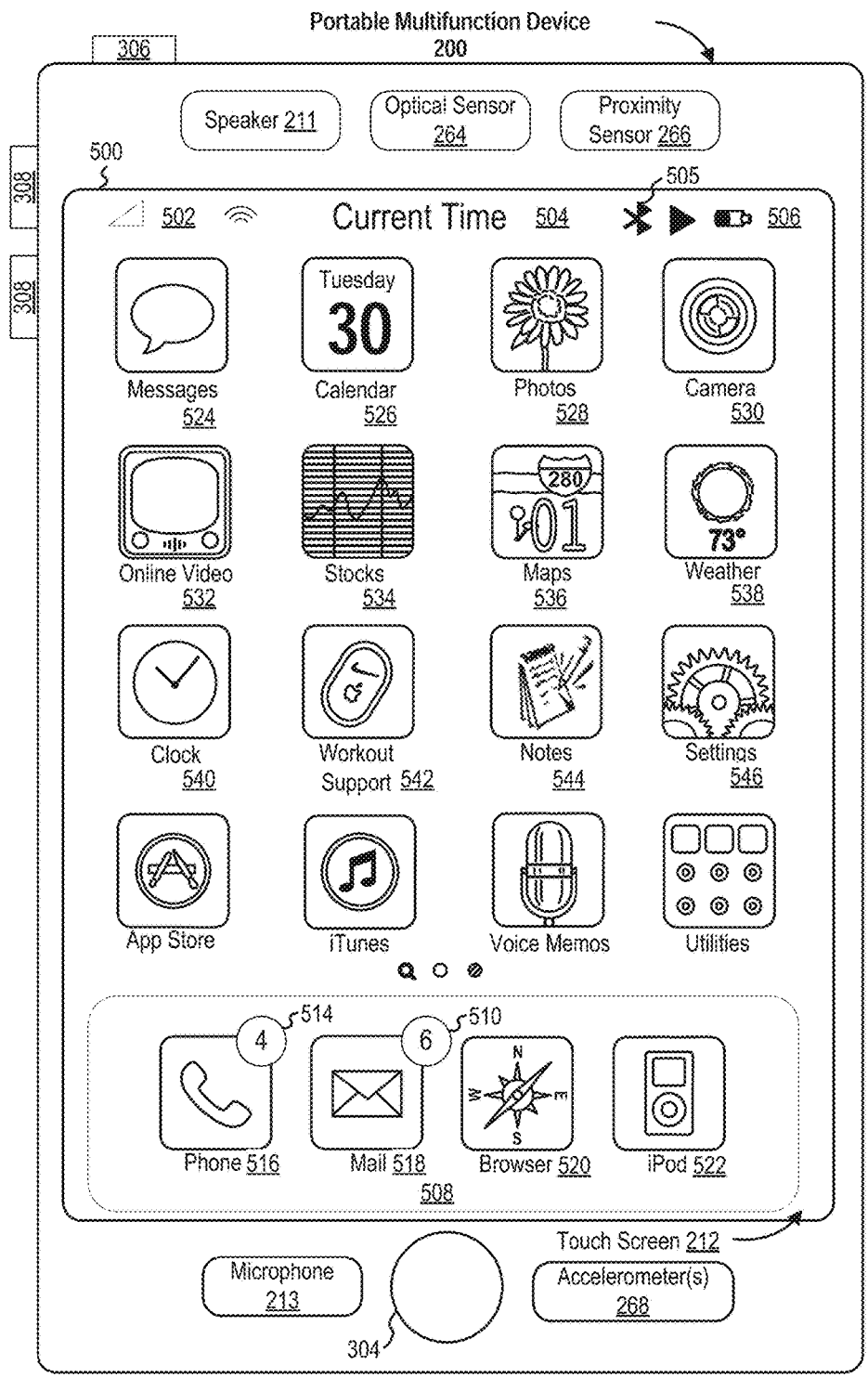
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
Icon 516 for telephone module 238, labeled "Phone," which optionally includes an indicator 514 of the number of missed calls or voicemail messages;
Icon 518 for email client module 240, labeled "Mail," which optionally includes an indicator 510 of the number of unread emails;
Icon 520 for browser module 247, labeled "Browser;" and
Icon 522 for video and music player module 252, also referred to as iPod (trademark of Apple Inc.) module 252, labeled "iPod;" and
Icons for other applications, such as:
Icon 524 for IM module 241, labeled "Messages;"
Icon 526 for calendar module 248, labeled "Calendar;"
Icon 528 for image management module 244, labeled "Photos;"
Icon 530 for camera module 243, labeled "Camera;"
Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
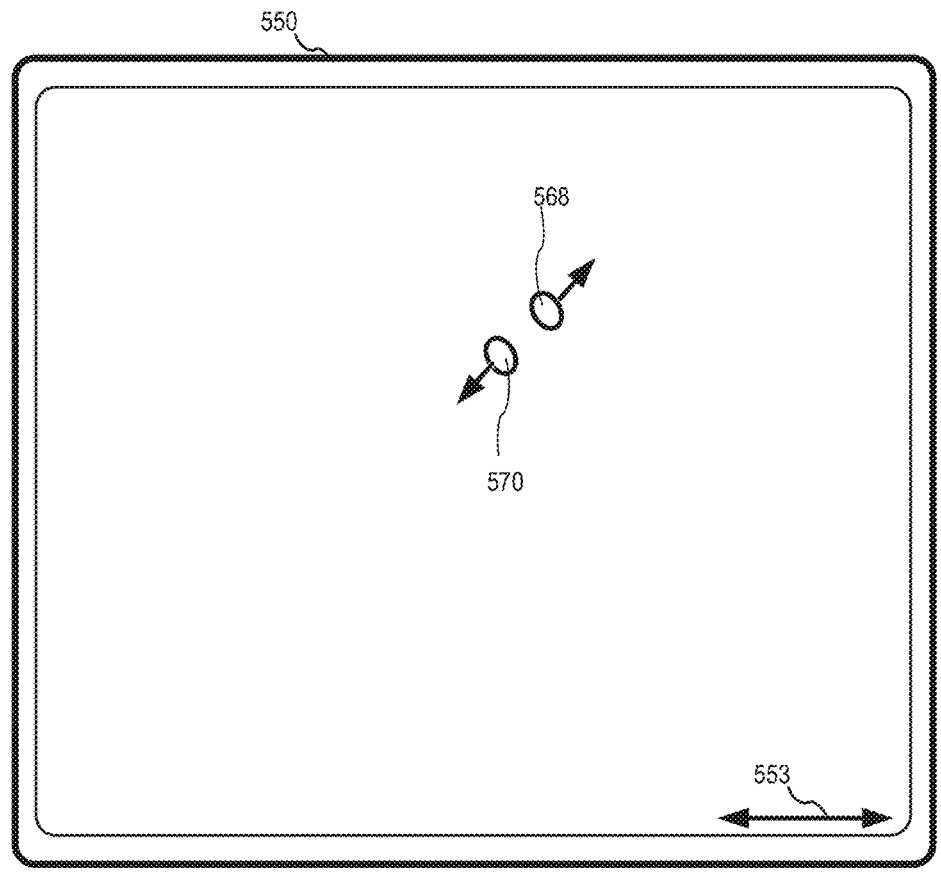
FIG. 5B illustrates an exemplary user interface for a multifunction device with a touch-sensitive surface that is separate from the display according to various examples.
Figure 5B:
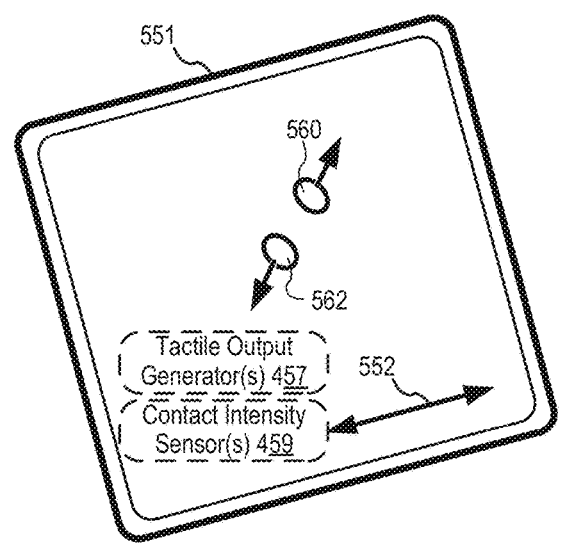

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, and/or finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
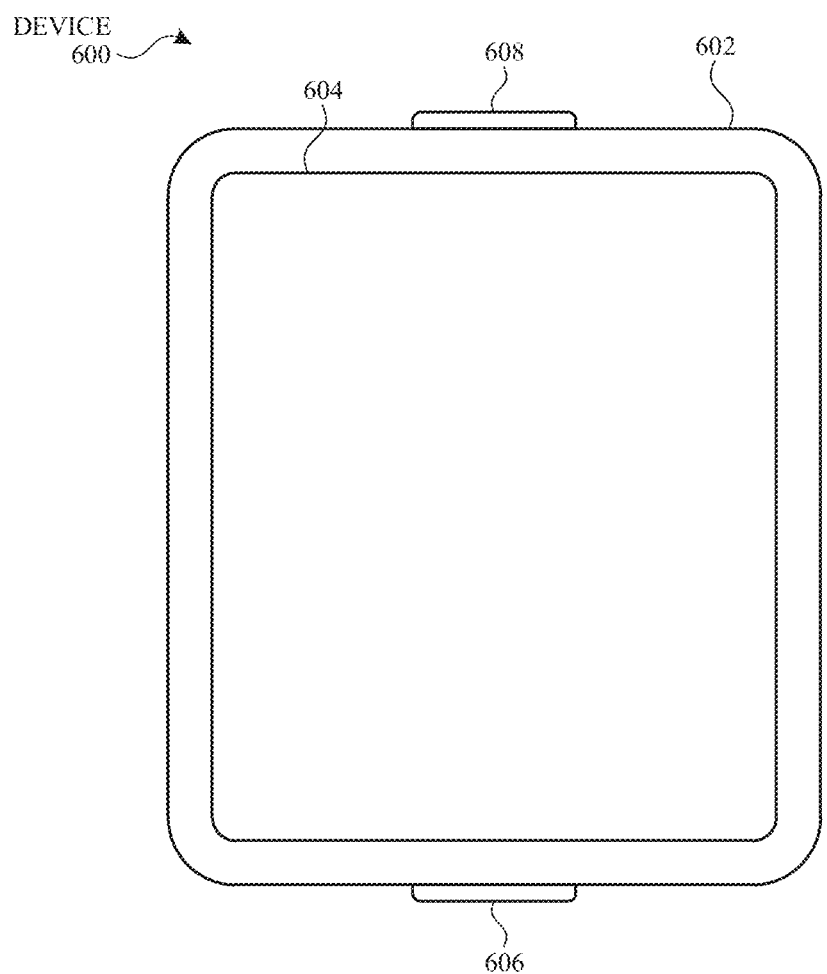
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
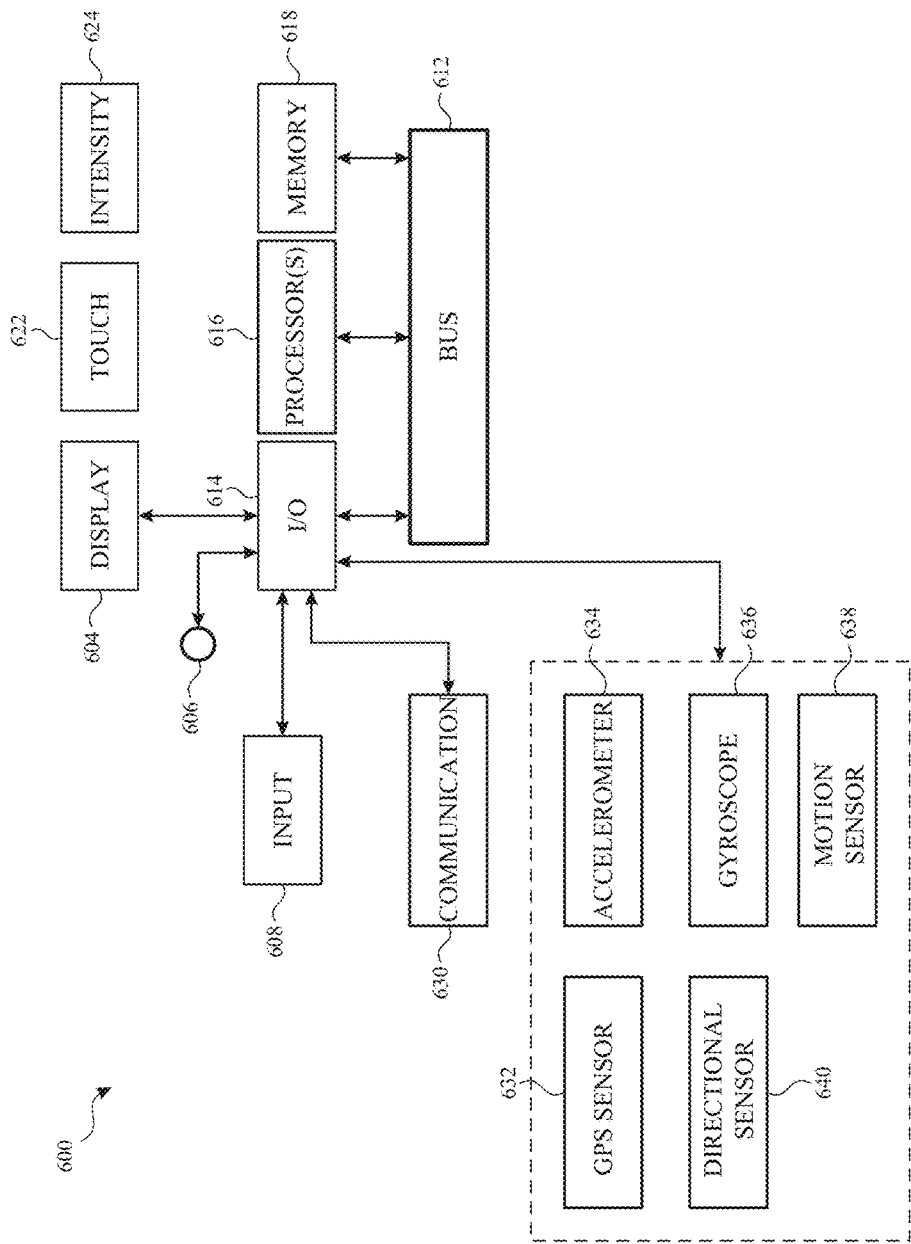
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques described below, including process 1000 (FIGS. 10A-E). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2A-B, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs, sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
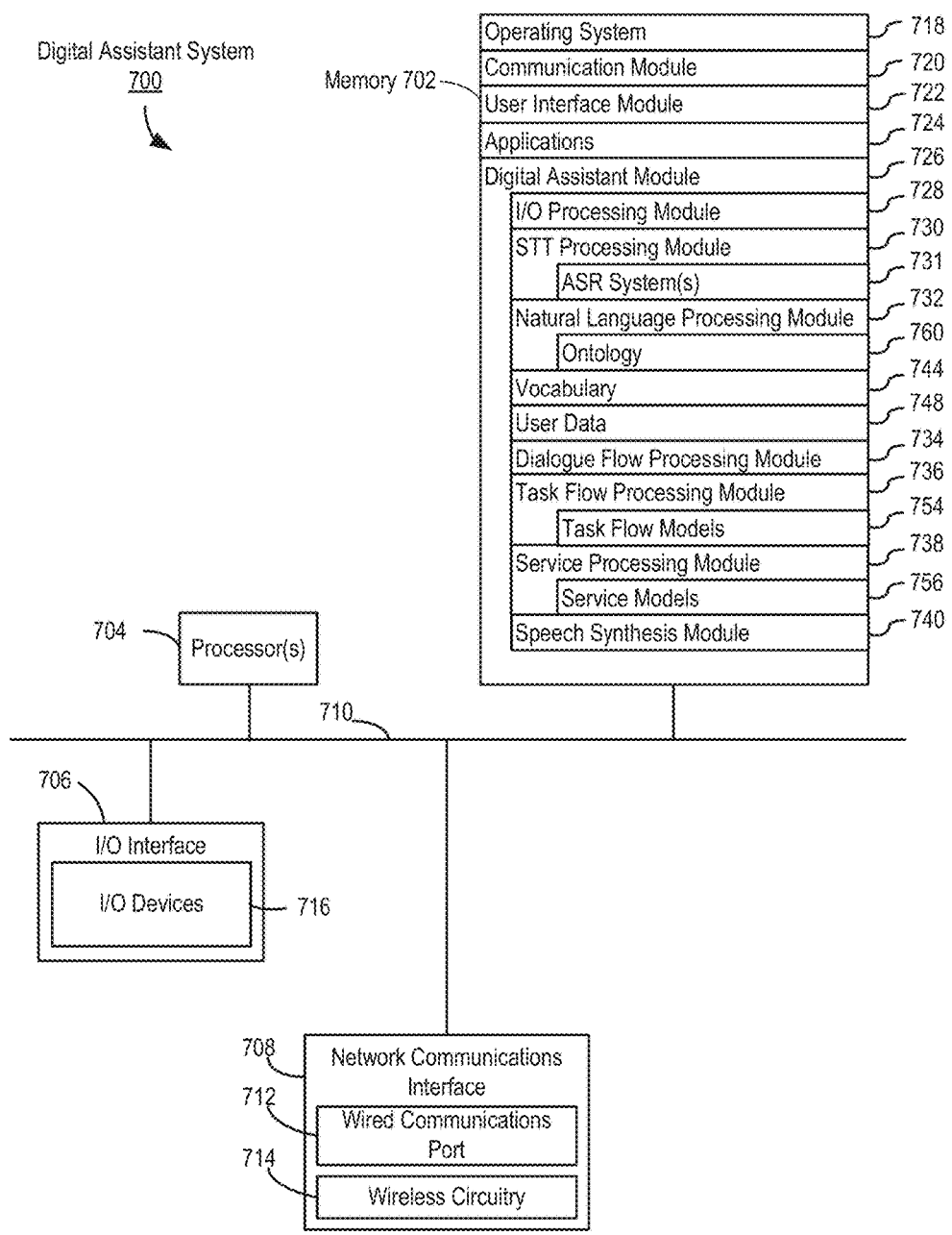
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and process them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-6B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) 712 can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing process 1200, described below. One or more processors 704 can execute these programs, modules, and instructions, and read/write from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIGS. 2A, 4, 6A-6B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems 731.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
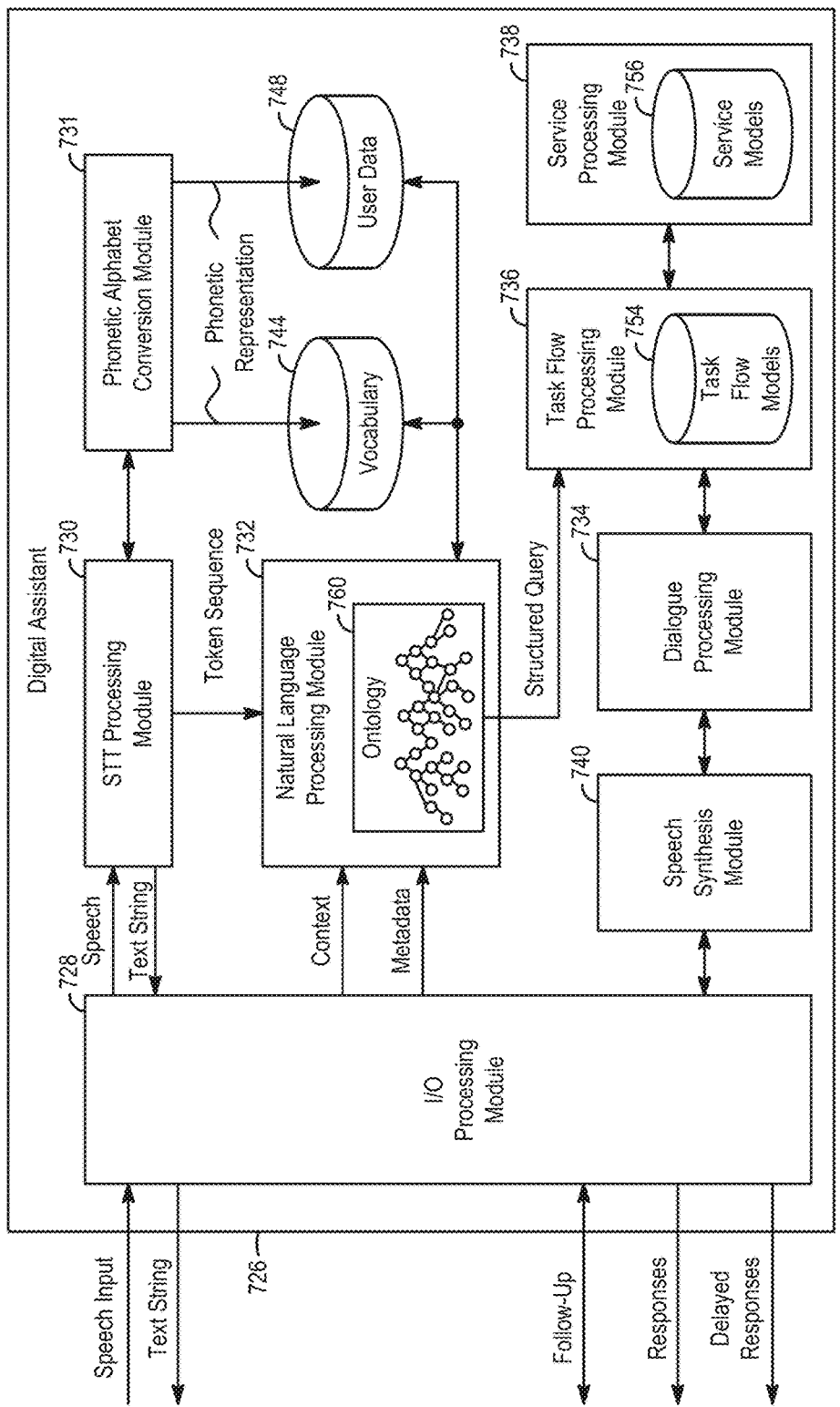
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or a speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /təˈmeɪroʊ/ and /təˈmɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /təˈmeɪroʊ/ can be ranked higher than /təˈmɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /təˈmeɪroʊ/ can be associated with the United States, whereas the candidate pronunciation /təˈmɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) can be ranked higher than the candidate pronunciation /təˈmɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /təˈmeɪroʊ/ corresponding to a portion of the speech input, it can then determine, based on vocabulary index 744, that this sequence corresponds to the word "tomato."

In some examples, STT processing module 730 can use approximate matching techniques to determine words in a voice input. Thus, for example, the STT processing module 730 can determine that the sequence of phonemes /təˈmeɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730 and attempt to associate the token sequence with one or more "actionable intents" recognized by the digital assistant. An "actionable intent" can represent a task that can be performed by the digital assistant and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754 or, in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
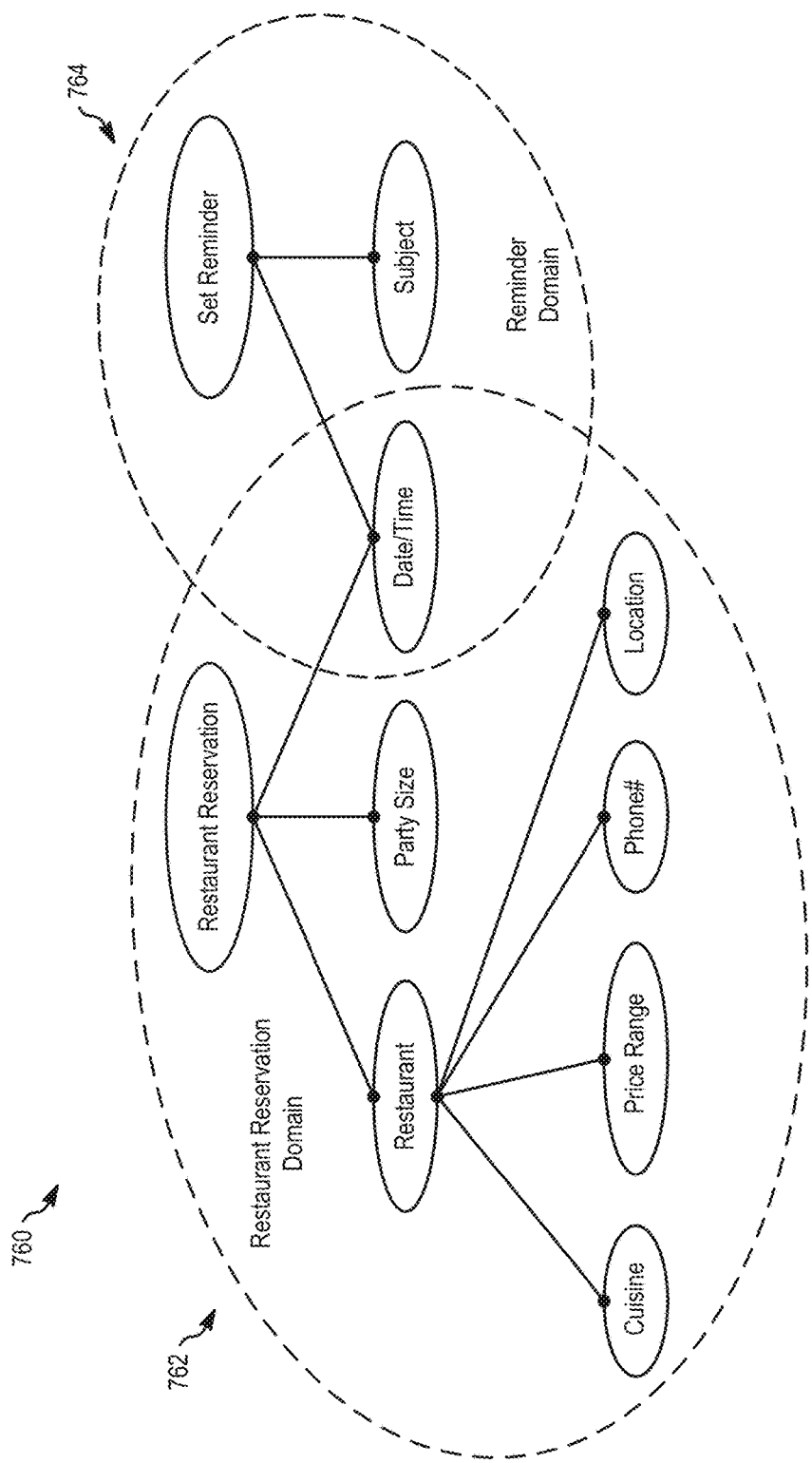
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task," and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's speech input contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous speech inputs. When such interactions are necessary, task flow processing module 736 can invoke dialogue flow processing module 734 to engage in a dialogue with the user. In some examples, dialogue flow processing module 734 can determine how (and/or when) to ask the user for the additional information and receive and processes the user responses. The questions can be provided to and answers can be received from the users through I/O processing module 728. In some examples, dialogue flow processing module 734 can present dialogue output to the user via audio and/or visual output, and receive input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®; (2) entering the date, time, and party size information in a form on the website; (3) submitting the form; and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Functions of a Digital Assistant

Figure 8B:
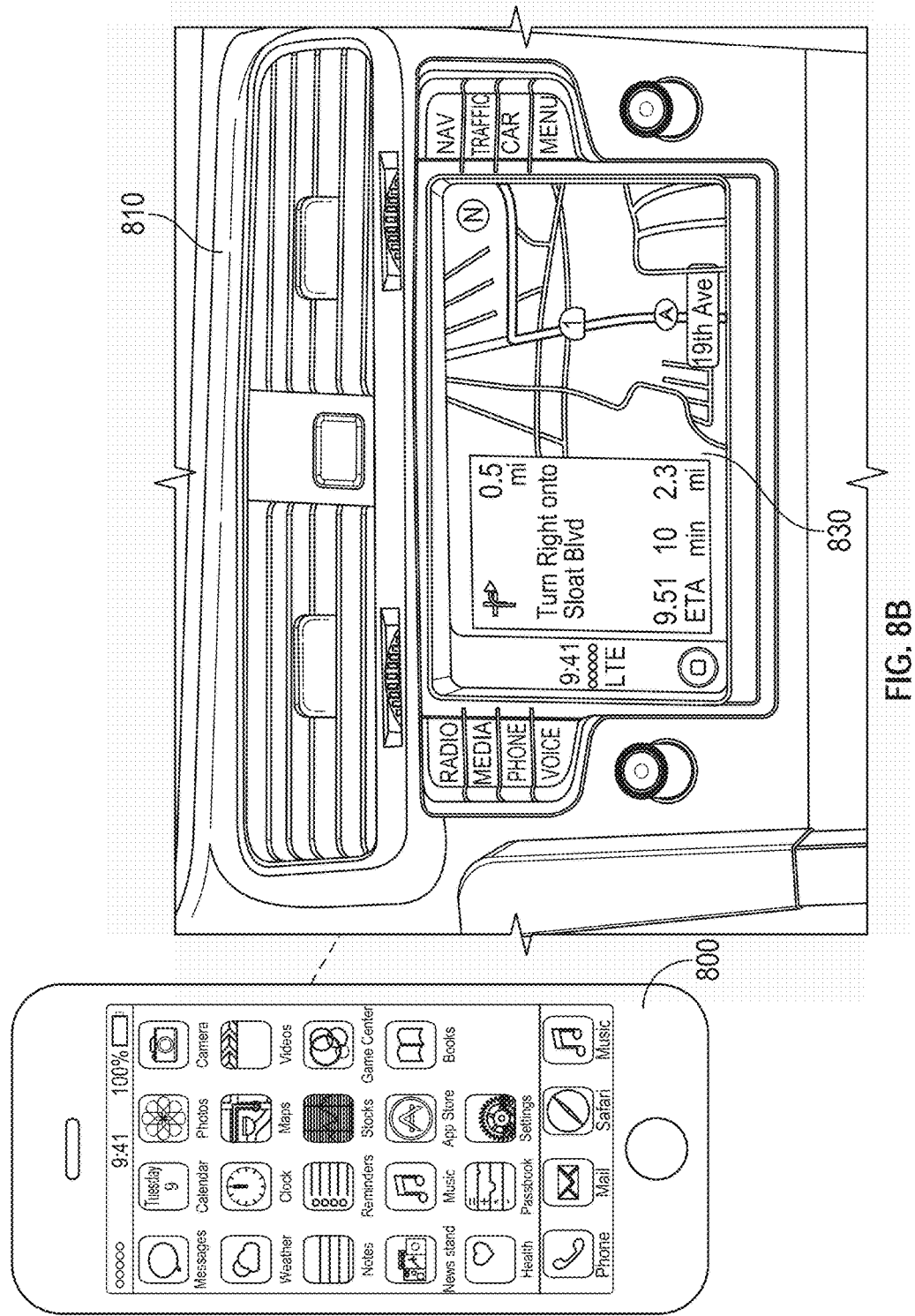

FIGS. 8A-8F and 9A-9D illustrate functionality of intelligent declining of an incoming call by a device 800. In some examples, device 800 can implement a digital assistant system (e.g., digital assistant system 700) according to various examples. In some examples, device 800, a server (e.g., server 108), or a combination thereof, may implement a digital assistant system (e.g., digital assistant system 700). With references to FIGS. 8A-8B, in some examples, device 800 can be a smartphone, a watch, a tablet, a laptop computer, a desktop computer, or the like. Device 800 can be implemented using, for example, device 104, 200, or 400. As shown in FIGS. 8A-8B, device 800 can detect one or more other electronic devices and communicate with other electronic devices. For example, device 800 can detect that an electronic device 810 (e.g., a CarPlay device, a vehicle navigation and entertainment device, a smartphone, a watch, a tablet, a laptop computer, a desktop computer, or the like) is within a communication range and connect to electronic device 810. The communication between device 800 and electronic device 810 may include one or more of a wireless connection (e.g., Wi-Fi, Bluetooth, cellular, personal hotspot) and a wired connection (e.g., a USB connection, a lightening connection).

In some examples, electronic device 810 can include a display 820, which may display one or more affordances (e.g., time information text 822, a home button 824, and one or more application icons 826A-N). Electronic device 810 can also receive user's input with respect to one or more of the affordances and perform corresponding tasks. For example, electronic device 810 can receive a user's voice input for navigation and in response, initiate a map application. Electronic device 810 can also receive a touch input of an affordance 826 associated with a map application, and initiate the map application, as illustrated in FIG. 8B.

With reference to FIGS. 8A-8B, in some embodiments, device 800 can be synchronized with electronic device 810. For example, the two devices can be synchronized with each other via a cloud service, a server, or a direct connection between the two devices. As a result, one or more of affordances 826A-N that electronic device 810 displays can correspond to the affordances of device 800. In some examples, one of device 800 and electronic device 810 can receive a user input and perform a corresponding task on one or both of device 800 and electronic device 810. For example, device 800 can receive a voice input or a tactile input requesting to perform a task of navigation. Device 800 can detect that electronic device 810 is within the communication range and determine that the task of navigation is to be performed on electronic device 810. Device 800 can make such determination based on contextual data such as the screen size of device 800 and electronic device 810, the user's preference, historical data, or the like.

Figure 8C:
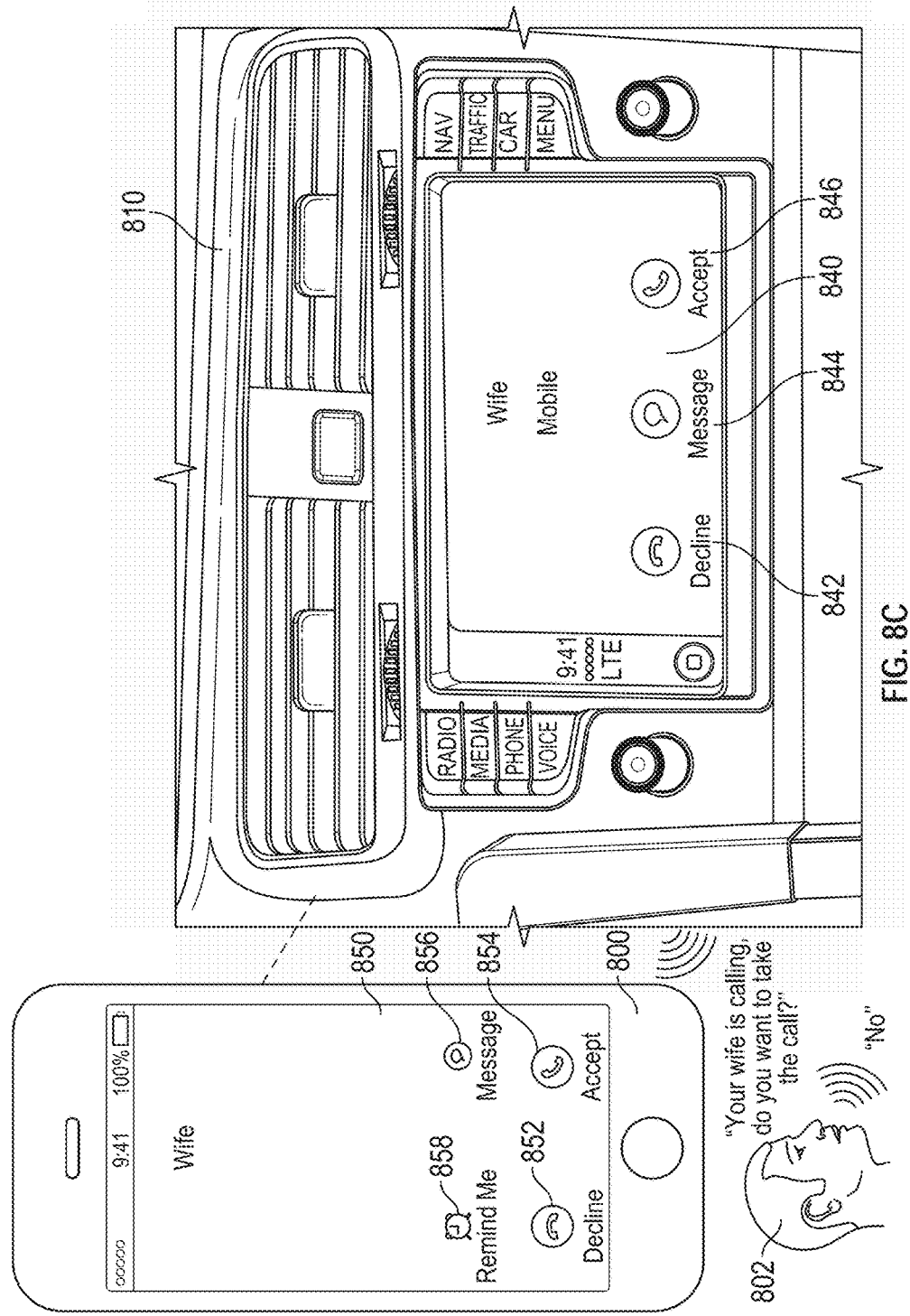

With reference to FIG. 8C, device 800 may receive an incoming call. The incoming call can be an audio call such as a telephone call or a voice-over-IP (VoIP) call. The incoming call can also be a video call such as a FaceTime request. In some examples, device 800 can provide information associated with the incoming call. For example, device 800 can display the caller's identity (e.g., the user's wife) on a user interface 850 and/or provide a voice output including information associated with the incoming call. For example, device 800 may provide a voice output such as "Your wife is calling, do you want to take the call?" In some examples, device 800 can also provide one or more options for responding to the incoming call. For example, device 800 can display one or more affordances 852, 854, 856, and 858 on user interface 850; and/or provide voice outputs including information associated with the affordances. Affordance 852 may be a "Decline" icon, which enables the user to decline the incoming call. Affordance 854 may be an "Accept" icon, which enables the user to answer the incoming call. Affordance 856 may be a "Message" icon, which enables the user to send a text message to the caller. Affordance 858 may be a "Remind me" icon, which enables the user to ignore the incoming call at the time the call is received, and in addition, automatically sets a reminder to remind the user to return the call.

As described, device 800 can detect that another electronic device (e.g., electronic device 810) is within the communication range and determine that a task is to be performed on the other electronic device. In some embodiments, based on such a determination, device 800 can synchronize with the other electronic device with respect to an incoming call, the information associated with the incoming call, and the options for responding to the incoming call. For example, device 800 can synchronize with electronic device 810 and cause electronic device 810 to display, on a user interface 840, the information associated with the incoming call (e.g., caller identity), and affordances 842, 844, and 846 representing options for responding to the incoming call. Affordances 842, 844, and 846 can be similar to those displayed on user interface 850 of device 800. In some examples, device 800 can also cause electronic device 810 to provide a voice output (e.g., "Your wife is calling, do you want to take the call?").

Figure 8D:
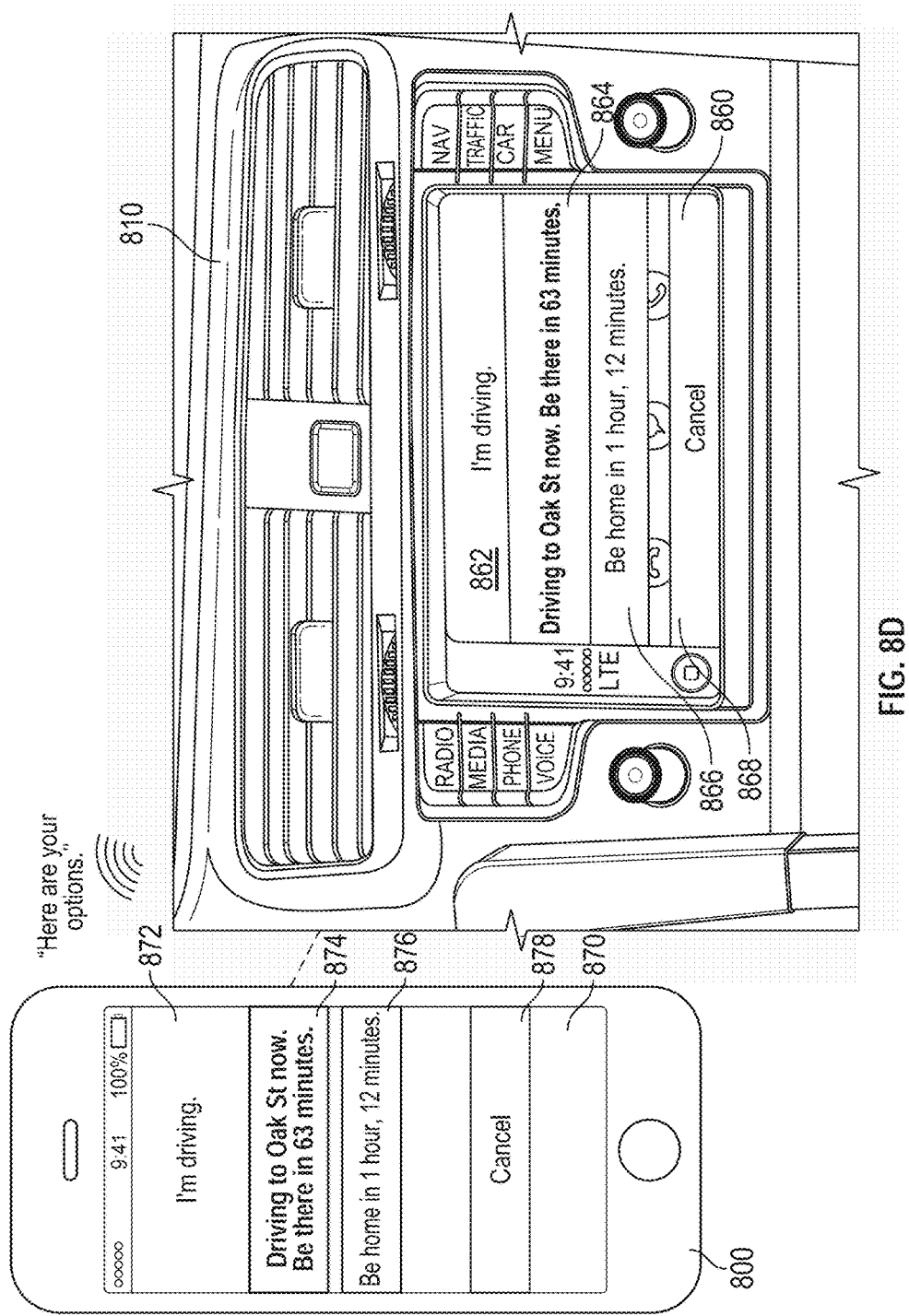

With reference to FIGS. 8C and 8D, after device 800 and/or electronic device 810 provides information associated with the incoming call, user 802 may choose to decline the call. For example, user 802 may be driving and thus does not want to answer the call for safety reasons. User 802 may also be participating in one or more other activities such as business activities (e.g., meeting, conferencing, presenting, etc.), sports activities (e.g., biking, jogging, swimming, gaming, etc.), personal or family activities (e.g., sleeping, reading, etc.), or any other activities. Thus, user 802 may want to decline the incoming call.

As shown in FIGS. 8C and 8D, device 800 and/or electronic device 810 can receive a user input from user 802 for declining the incoming call. For example, user 802 may touch affordances 852/842, or provide a voice input (e.g., "No") for declining the call. In some embodiments, after receiving the user input for declining the call, device 800 and/or electronic device 810 can provide one or more response options associated with declining the incoming call. For example, as illustrated in FIG. 8D, device 800 can provide affordances 872, 874, 876, and 878 on a user interface 870. Correspondingly, electronic device 810 can provide affordances 862, 864, 866, and 868 on user interface 860. The affordances represent a plurality of response options (e.g., "I'm driving;" "Driving to Oak St now. Be there in 63 minutes;" "Be home in 1 hour, 12 minutes."). Device 800 and/or electronic device 810 can also provide a voice output including, for example, "Here are your options" and followed by a voice output of the response options.

In some embodiments, device 800 and/or electronic device 810 can provide one or more response options associated with declining the incoming call without receiving the user input for declining the call first. For example, in response to receiving the incoming call, and without user input, device 800 and/or electronic device 810 can provide one or more response options for declining the incoming call (e.g., response options represented by affordances 872/862, 874/864, 876/866, and 878/868) and other response options (e.g., accept, remind me, or message). In some embodiments, in response to receiving an incoming call, device 800 and/or electronic device 810 provides all response options (including multiple declining options and other response options) for responding to the incoming call to the user. Providing all response options enables the user to select a response option with a single user input.

In some embodiments, to provide one or more response options associated with declining the incoming call, device 800 can obtain one or more user-specific items in response to receiving the incoming call. In some examples, device 800 obtains the user-specific items after it receives a user input declining the incoming call. As shown in FIG. 8C, device 800 may obtain user-specific items after receiving user 802's touch input on affordance 852 to decline the call or receiving user 802's voice input indicating the user does not want to take the incoming call. In some examples, in response to receiving an incoming call, device 800 automatically obtains the user-specific items without receiving a user input (e.g., a touch input or a voice input) or a user intervention.

The one or more user-specific items can include contextual data, user-specific historical data, and/or user inputs. As described, contextual data can include sensor information, e.g., lighting, ambient noise, ambient temperature, images or videos of the surrounding environment, etc. In some examples, the contextual data can also include the physical state of the devices (e.g., device 800 and/or electronic device 810), such as device orientation, device location, device operation mode status, device connectivity, user's communication status, device temperature, power level, speed, acceleration, motion patterns, cellular signals strength, and device's hardware and software status. As an example, with reference to FIGS. 8B and 8C, device 800 can obtain location data such as the user's current location (e.g., driving on the 19$^{th}$ Ave towards Sloat Blvd) and the user's destination location (e.g., Oak St) based on GPS location data and settings.

Contextual data can include a current operating mode status, such as "do not disturb," "silent," "airplane," and "airplay." For examples, the user may be attending a meeting and thus may have configured device 800 to "do not disturb" or "silent" mode; the user may be aboard an airplane and thus may have configured device 800 to "airplane" mode; the user may be presenting using slides and may have configured device 800 to "airplay" to "airplay" mode.

Contextual data can include user's communication status. For example, contextual data may include an indication that device 800 is currently being used for another phone call via the cellular channel when the incoming call is received. As a result, the contextual data indicates that the user is currently participating in another call when the incoming call is received. As another example, contextual data may include an indication that device 800 is wirelessly connected to electronic device 810 such as a navigation and entertainment device of a vehicle. As a result, the contextual data indicates that the user is communicating via the navigation and entertainment device of the vehicle.

In some examples, contextual data can include information related to device's hardware and software. For example, contextual data may include content accessible to device 800. The content may include application data such as the user's calendar data, user's contact list, user's contact's location data (e.g. the caller's current and destination location data), user's note, emails, text messages, voicemails, saved locations, social media posts, and/or application settings. The content may be located on device 800 or on another electronic device (e.g., electronic device 810, server system 108).

As described, the user-specific data items can include user-specific historical data. For examples, user-specific historical data may include the user's historical commute data (e.g., the user's typical time to go to work, typical time to go home, the length of the commute, the work and home locations, etc.), the user's routines activities (e.g., the time and location of the user weekly meetings, the time and location of the user's daily exercise, etc.), and the user-specific preferences (e.g., the user's preferred place for grocery shopping, the user's preferred route to go to work or home, the user's preferred lunch place, etc.).

The user-specific data items can also include one or more user's inputs. For example, the user may provide a voice input to device 800 such as "I am driving now," "I am heading to Oak St now," "I am in a client meeting," "I will be home in an hour," or the like. It is appreciated that the user-specific data items can include any data provided by a user, device 800, electronic device 810, or any other electronic devices communicatively coupled to device 800. The user-specific data items, including contextual data, user-specific historical data, and/or user inputs, can be obtained by device 800 for determination of one or more user status options, as described in more detail below.

With reference to FIG. 8D, based on the obtained one or more user-specific data items, device 800 can determine one or more user status options. User status options represent the possible user statuses at the time device 800 receives the incoming call. In some examples, user status options indicate one or more activities the user may be participating in at the time device 800 receives the incoming call. For example, contextual data may indicate that, at the time of receiving the incoming call, device 800 is communicating with electronic device 810 (e.g., a vehicle navigation and entertainment device) and is moving at a speed corresponding within the speed range of a motor vehicle. Thus, based on such contextual data, device 800 can determine that the user may be driving, and therefore one user status option is that the user is driving. As another example, contextual data can include the user's calendar data, which may indicate that the user has a scheduled meeting at the time device 800 receives the incoming call. Based on such contextual data, device 800 can determine that one user status option is that the user is attending a meeting. As another example, user-specific historical data may indicate that at the time device 800 receives the incoming call, the user is typically driving home, is doing exercises, is grocery shopping, or is participating in any other routine activities. Based on the user-specific historical data, device 800 can determine one or more user status options including, for example, driving home, doing exercises, or grocery shopping.

In some examples, to determine one or more user status options, device 800 can determine, based on a pre-determined activity set, whether one or more user-specific data items indicate that the user is participating in one or more activities among the pre-determined activity set. A pre-determined activity list may include common activities such as driving, riding a bus/train to work, exercising, working, meeting, conferencing, sleeping, social activities, or the like. In some examples, the pre-determined activity list can be customized to a particular user to include user-specific activities. For example, historical data may indicate that the user routinely participating in a weekly meeting at a particular location. The pre-determined activity list for that particular user can therefore include the meeting at the particular location during the particular time period. In some examples, the pre-determined activity list can be adaptively applied to determine user status options. For example, the pre-determined activity list may be adapted for a particular day or date to account for holidays or the user's vacations. Thus, a pre-determined activity list may not include a routine weekly meeting for a particular date if it is a holiday or if it falls into the user's vacation period. In some examples, the pre-determined activity list can be dynamically updated to reflect any changes of the user's activities. For example, if device 800 determines that the user-specific data items indicates that the user is participating in an new activity that is not among the pre-determined activity set, it can update the pre-determined activity list to include that new activity.

In accordance with a determination that the user is participating in one or more activities, device 800 can generate a user status option for each of the activities the user is participating in. For example, at the time device 800 receives an incoming call, the physical state of the device (e.g., speed) may indicate that the user is driving; and the user's calendar data may indicate that the user is participating in a routine conference call. As a result, device 800 can generate a user status option corresponding to each of the activities the user may be participating in at the time device 800 receives the incoming call. In the above example, the first user status option may be that the user is driving; and the second status option may be that the user is participating in a conference call.

With reference to FIG. 8D, in some embodiments, device 800 can determine whether the user-specific data items indicate that the one or more activities the user is participating in at the time device 800 receives the incoming call are associated with one or more locations. In accordance with a determination that the one or more activities are associated with one or more locations, device 800 can perform at least one of: associating each of the locations with the corresponding user status option and generating an additional user status option based on each of the locations. Continuing the above examples, the user-specific data items may include the GPS location data of device 800, which may indicate that the user is driving to a specific destination location (e.g., 1234 Oak St). As a result, device 800 may associate the location of Oak St to the first user station option such that the first user status option becomes the user is driving to Oak St. In some examples, instead of modifying the existing user status options, device 800 may generate additional user status options, e.g., a third user status option. The third user status option may be that the user is driving to Oak St. As another example, user-specific historical data may indicate the user typically drives home around the time device 800 receives the incoming call. As a result, device 800 may generate a fourth status option, which may be that the user is driving to home.

In some embodiments, device 800 can determine a confidence value associated with each user status option. As described, device 800 can determine one or more user status options based on user-specific data items such as contextual data, user-specific historical data, and/or user inputs. The determined one or more user status options represent possible user statuses, and may or may not accurately indicate the user status. For example, while the user-specific historical data indicates that at the time device 800 receives the incoming call, the user typically drives home, the user may deviate from his or her routine schedule and instead drive to another location on one particular day. As another example, while the use's calendar data indicates that the user has a routine meeting at the time of receiving the incoming call, the scheduled meeting may be cancelled for a particular day. Thus, based on the one or more possible user status options, device 800 determines a confidence value associated with each of the user status options. The confidence value indicates how likely the determined user status option matches actual user status.

In some embodiments, to determine a confidence value associated with each user status option, device 800 can evaluate a probability associated with each of the user status options and assign a confidence value to each of the user status options based on the corresponding probability. In some examples, evaluating the probability can be based on one or more of the user-specific data items. Continuing the above examples, the third user status option (e.g., the user is driving to Oak St) is determined based on the GPS location data (e.g., the destination location is configured to be 1234 Oak St). As a result, device 800 may evaluate that the probability of the third user status option is very high (e.g., 90-100% certainty) because the user configured the destination location to be 1234 Oak St. As another example, the fourth user status option (e.g., the user is driving home) is determined based on user-specific historical data. As a result, device 800 may evaluate that the probability of the fourth user status option is medium to high (e.g., 50-60% certainty) because there is a likelihood that the user deviates from his or her routine schedule.

In some examples, device 800 can evaluate the probability of a user status option based on correlation between a plurality of user-specific data items. Continuing the above examples, the second user status option (e.g., the user is participating in a conference call) is determined based on the user's calendar data (e.g., the user's calendar indicates a scheduled conference at the time device 800 receives the incoming call). Device 800 can evaluate the probability of the second user status option by correlating the user's calendar data to one or more other user-specific data items such as the user's communication status, user-specific historical data, device operation mode status, device connectivity, cellular signals strength, the moving speed of the device, etc. For example, if device 800 determines that its moving speed is within the speed range of a moving vehicle, and that the user's communication status indicates the user is not communicating with others, device 800 may evaluate the probability of the second user status option (e.g., the user is participating in a conference) is low (e.g., 0-10%), despite that the user's calendar data indicates that the user is participating in a scheduled conference.

In some embodiments, device 800 can evaluate the probability associated with each user status option based on a probability of another user status option. Continuing with the above examples, device 800 may evaluate the probability of the fourth user status option (e.g., the user is driving home) based on the probability of the third user status option (e.g., the user is driving to Oak St). For example, if device 800 evaluates the probability of the third user status option to be high or almost certain (e.g., 90-100%), it is less likely the probability of the fourth user status option is also high or almost certain. That is, it is less likely the user is both driving to Oak St and driving home at the same time when the incoming call is received. Accordingly, device 800 can evaluate the probability of the fourth user status option (e.g. 50-60%) to be lower than that of the third user status option (e.g., 90-100%). In some examples, probability of one user status option may not affect the probability of another user status option. For example, the probability of the third user status option (e.g., the user is driving to Oak St) does not affect the probability of the first user status option (e.g., the user is driving). Under such circumstances, device 800 can evaluate the correlation between the two user status options and determine that they do not affect each other. Device 800 may then evaluate the correlation between the next two user status options. In some examples, device 800 can also evaluate correlation between more than two user status options.

Based on the evaluated probabilities, device 800 can assign confidence value to the one or more user status options. Continuing with the above examples, device 800 may assign a confidence value of 100 to the first user status option (e.g., the user is driving) and the third user status option (e.g., the user is driving to Oak St); assign a confidence value of 60 to the fourth user status option (e.g., the user is driving home); and assign a confidence value of 10 to the second user status option (e.g., the user is participating in a conference call). A confidence value represents the likelihood of a particular user status option matching with the actual user status.

With reference to FIG. 8D, in some examples, device 800 can determine whether confidence values of the one or more user status options exceed a predetermined threshold; and in accordance with the determination of the one or more confidence values exceeding a predetermined threshold, device 800 can provide a plurality of response options associated with declining the incoming call. Continuing with the above examples, a predetermined threshold confidence value may be 50. Device 800 can compare the confidence values of the user status options (e.g., 100 for the first user status option of driving, 10 for the second user status option of participating in a conference, 100 for the third user status option of driving to Oak St, 60 for the fourth user status option of driving home) with the predetermine threshold. If the confidence value of a particular user status option is greater than or equal to the predetermined threshold, device 800 can provide a plurality of response options corresponding to the user status options. For the above examples, as shown in FIG. 8D, device 800 can determine that the probabilities of the first, third, and fourth user status options exceed the predetermined threshold of 50; but the probability of the second user status option does not exceed the predetermined threshold. As a result, device 800 selects the first, third, and fourth user status options; and provides response options (e.g., response options represented by affordances 872, 874, and 876) representing the first, third, and fourth user status options. For example, a first response option may include "I'm driving;" a second response option may include "Driving to Oak St now. Be there in 63 minutes;" and a third response option may include "Be home in 1 hour, 12 minutes." In some examples, the response options can be provided by displaying them on a user interface 870 of device 800. In some examples, one or more response options may be provided on another electronic device (e.g., response options may be represented by affordances 862, 864, and 866; and may be provided on a user interface 860 of electronic device 810). In some examples, device 800 and/or electronic device 810 can provide the response options by speech outputs.

In some embodiments, the predetermined threshold can be adjusted or updated. For example, if device 800 determines that there is a large number (e.g., 5 or more) of user status options that have associated confidence values exceeding the predetermined threshold, device 800 can increase the threshold confidence value to select the user status options with the highest confidence values. It is appreciated that the predetermined threshold can have any desired value.

With reference to FIG. 8D, as described, in accordance with the determination of the confidence values exceeding a predetermined threshold, device 800 can provide one or more response options for declining the incoming call. In some examples, the response options can include representations of the corresponding user status options and optionally include additional information. Continuing the above examples, device 800 may provide a first response option (e.g., "I'm driving") representing the first user status option (e.g., the user is driving). Device 800 may provide a second response option (e.g., "Driving to Oak St now") representing the second user status option (e.g., the user is driving to Oak St). The second response option may include additional information (e.g., "Be there in 62 minutes"). The additional information can be determined by device 800 based on one or more user-specific data items. For example, based on the current location of the user and the destination location, device 800 can estimate the time that it takes to drive from the current location to the destination location. The time can be included in the response option such that the response option is more communicative to the caller. For example, additional information that may be included in the third response option may include "Be home in 1 hour, 12 minutes." Other additional information may include, for example, "I am parking, see you in 2 minutes," "I am in a meeting, will call you in 5 minutes," or the like.

Figure 8E:
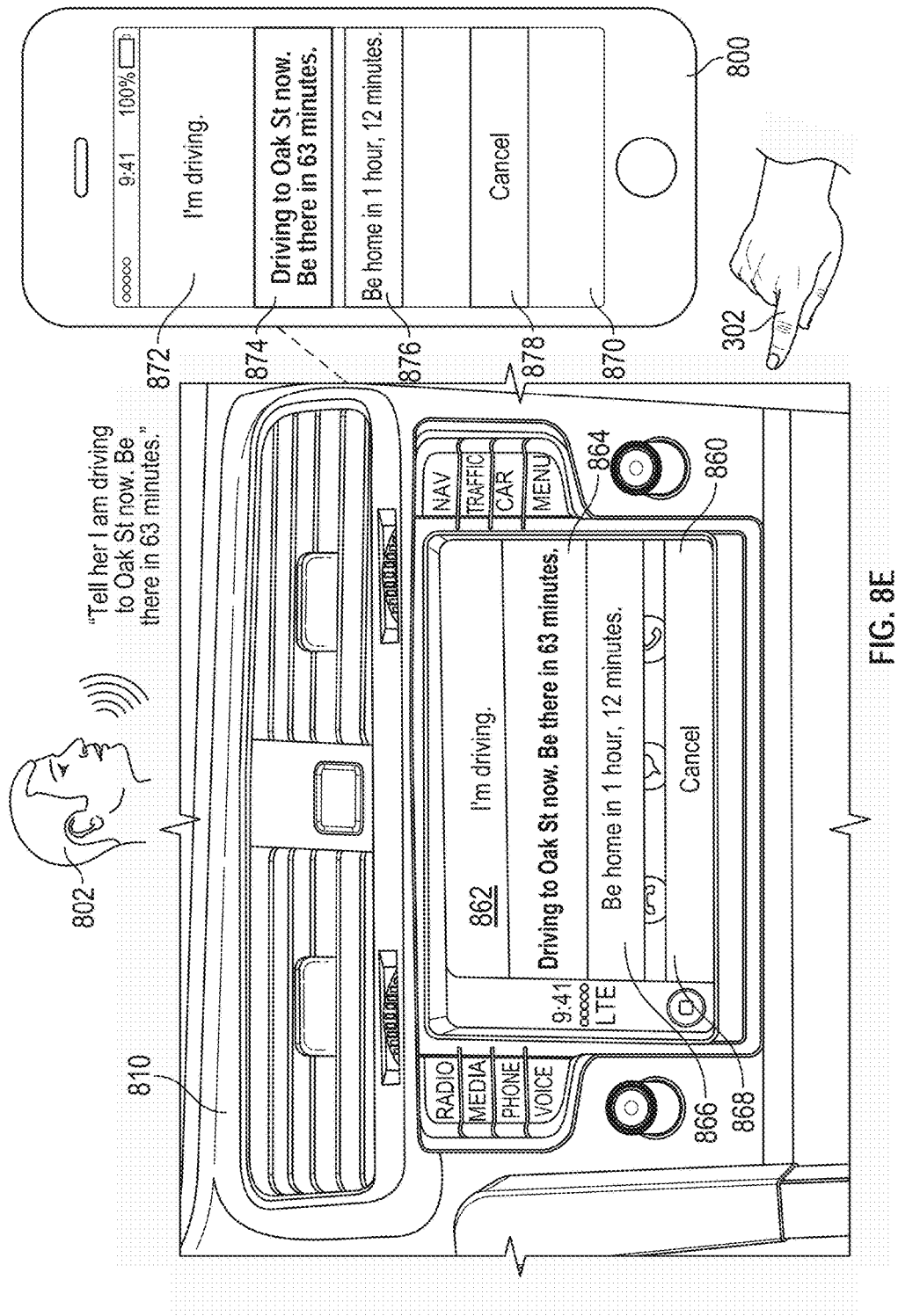

With reference to FIGS. 8D and 8E, in some examples, device 800 can highlight a response option that includes a representation of the user status option having the highest confidence value. A user status option having the highest confidence value indicates that the particular user status option most likely reflects the actual user status. Continuing the above examples, the third user status option of driving to Oak St may have a confidence value of 100, which is the highest among all the user status options. Corresponding, in providing the second response option (e.g., "Driving to Oak St now. Be there in 63 minutes") corresponding to the third user status option, device 800 can highlight that response option. For example, device 800 can change the foreground and/or background color; change a font and/or emphasis; and/or change the content, voice, tone, volume, etc. of a voice output of the second response option.

In some examples, two or more user status options may have highest confidence values or have comparable highest confidence values. Device 800 can highlight a corresponding response option that is more informative or appropriate. In the above examples, the first user status option (e.g., the user is driving) and the third user status option (e.g., the user is driving to Oak St) may both have confidence values of 100, or may have confidence values within a comparable range. As illustrated in FIG. 8E, device 800 provides a first response options (e.g., "I'm driving) and a second response option (e.g., "Driving to Oak St now. Be there in 63 minutes.") corresponding to the first user status option and the third user status option, respectively. Device 800 can determine that the second response option ((e.g., "Driving to Oak St now. Be there in 63 minutes.") may be more informative and appropriate than the first response option (e.g., "I'm driving."). As a result, device 800 can highlight the second response option, as illustrated by affordances 874/864 of FIG. 8E.

With reference to FIGS. 8D and 8E, in some embodiments, device 800 can order the one or more response options based on their confidence values. Continuing the above examples, the first user status option (e.g., the user is driving) may have a confidence value of 100; the third user status option (e.g., the user is driving to Oak St) may have a confidence value of 100; and the fourth user status option (e.g., the user is driving home) may have a confidence value of 60. In accordance with the confidence values, device 800 can order the response options corresponding to the user status options. For example, device 800 may order the response options corresponding to the first, third, and fourth user status options from top to bottom, indicating the order of descending confidence values. As illustrated in FIG. 8E, the first, third, and fourth user status options may be represented by affordances 872, 874, and 876 of device 800; and affordances 872, 874, and 876 may be arranged from top to bottom on user interface 860. In some examples, device 800 can cause electronic device 810 to similarly order the response options represented by affordances 862, 864, and 866 of user interface 860.

With references to FIGS. 8D and 8E, in some embodiments, device 800 can provide one or more additional response options for declining the incoming call. The additional response options may be non-user specific response options. For example, the additional response option can be standard response options that are not specific to any particular user. As shown in FIGS. 8D and 8E, device 800 may provide a response option associated with affordance 878 (and similarly affordance 868) to allow the user to cancel or dismiss user interface 870 (or similarly user interface 860) that provides the affordances representing the response options. Under some circumstances, the user may not want to select any of the response options and thus can select affordance 878 to go back to a previous user interface (e.g., user interface 850 and similarly user interface 840 illustrated in FIG. 8C). It is appreciated that the additional response options may include any non-user specific response options such as "hang-up," "send to voice mail," "cannot talk right now," "call you right back," or the like.

With reference to FIG. 8E, in some embodiments, after providing one or more response options, device 800 may receive a selection of a response option from the one or more response options. As shown in FIG. 8E, device 800 and/or electronic device 810 may receive a selection of one of affordances 872, 874, 876, or 878 (or similarly 862, 864, 866, or 868) via the display of device 800 and/or electronic device 810. For example, user 802 may touch affordance 874 (or affordance 864) to select the response option "Driving to Oak St now. Be there in 63 minutes." In some examples, device 800 and/or electronic device 810 may receive a voice input including the selection of a response option from the plurality of response options. For example, user 802 may provide a voice input such as "Tell her I am driving to Oak St now. Be there in 63 minutes," "select the Oak St option," "select the second option from the top," or the like.

Figure 8F:
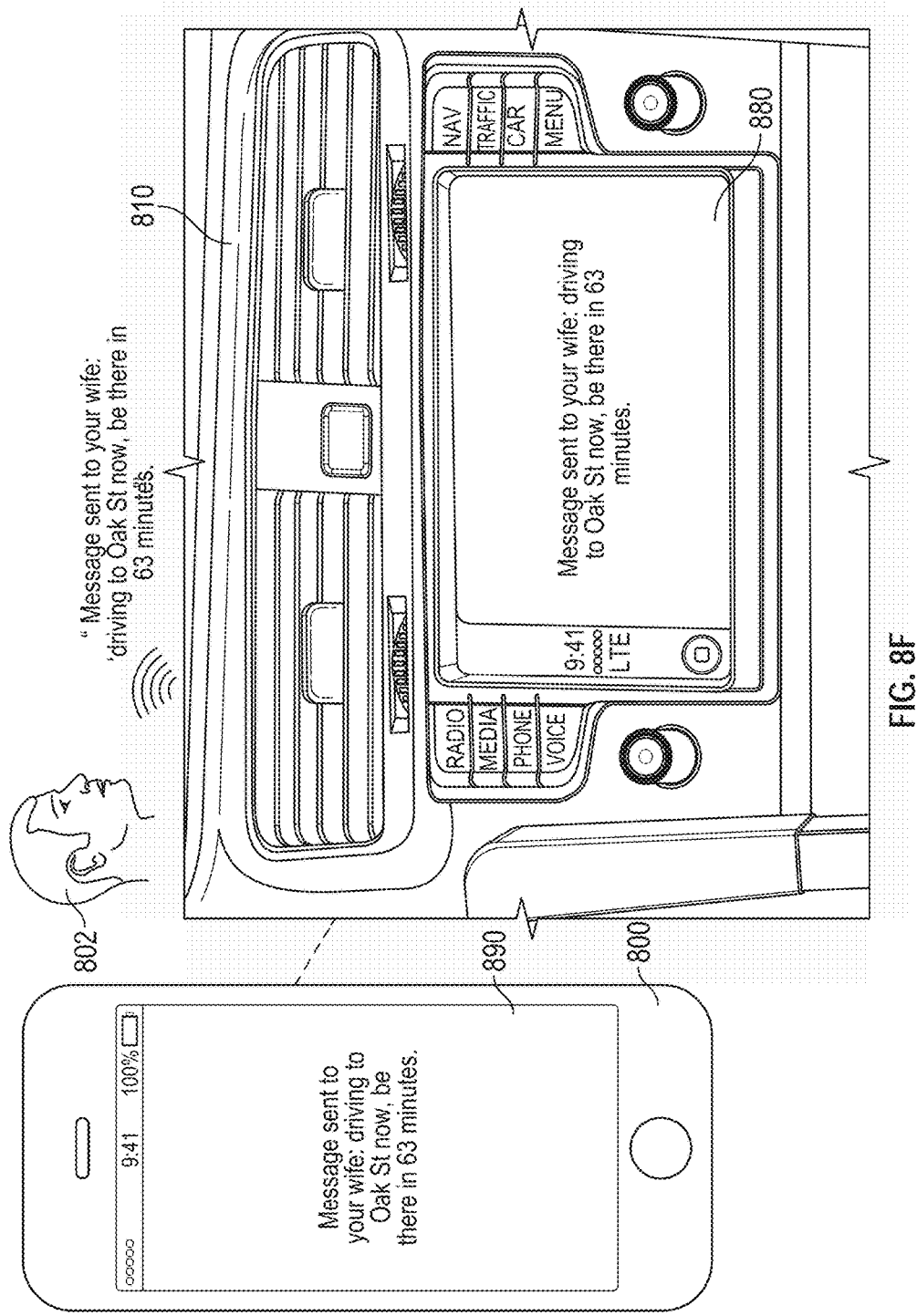

With reference to FIGS. 8E and 8F, in some embodiments, device 800 can decline the incoming call based on the selected response option. Continuing the above examples, after receiving the user's selection of affordance 874 (or affordance 864) representing the response option "Driving to Oak St now. Be there in 63 minutes," device 800 can decline the incoming call using the selected response option. For example, device 800 can generate a message corresponding to the selected response option and transmit the message to the caller. The message may include at least one of a text message, a voice message, a map location of the user, a copy of the user's calendar, a device status, or the like.

In some examples, the text message and/or the voice message can include the selected response option (e.g., "Driving to Oak St now. Be there in 63 minutes."), thereby providing information that is more informative and communicative to the caller. In some examples, a map location may be sent to the caller to inform the caller of the user's current location. The map location may be dynamically updated to reflect the user's current location. In some examples, a copy of the user's calendar or a calendar entry may be sent to the caller to show that user is currently busy (e.g., attending a meeting). In some examples, a device status (e.g., airplane mode, do-not-disturb mode, battery is low) may be sent to the caller such that the caller is informed of the user's device status. For example, user 802 may not want to answer the incoming call if the battery of device 800 is running low.

As described, in some embodiments, device 800 can receive a voice input including the selection of the response option. Device 800 can decline the incoming call based on the received voice input of the selected response option. For example, as described above, a digital assistant of device 800 can interpret a natural language voice input to infer user intent, and performs actions based on the inferred user intent. For example, to act on an inferred user intent, the digital assistant of device 800 can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form. For declining the incoming call, the digital assistant of device 800 can infer the user intent from the received voice input indicating the selected response option, identify a task flow of sending a text message/voice message to the caller, generate a message corresponding to the selected response option, and transmit the message to the caller.

In some embodiments, device 800 can decline the call without transmitting a message to the caller. For example, without transmitting a message to the caller, device 800 can decline the call by terminate the call, transfer the caller to the user voice mail, or the like.

As illustrated in FIG. 8F, after declining the call, device 800 and/or electronic device 810 can display a user interface 890 and/or 880 providing a confirmation to user 802. For example, user interface 890 and/or 880 may provide a message such as "Message sent to your wife: driving to Oak St now, be there in 63 minutes." In some examples, device 800 and/or electronic device 810 can provide a speech output (e.g., "Message sent to your wife: Driving to Oak St now. Be there in 63 minutes") confirming the declining of the incoming call.

Figure 9B:
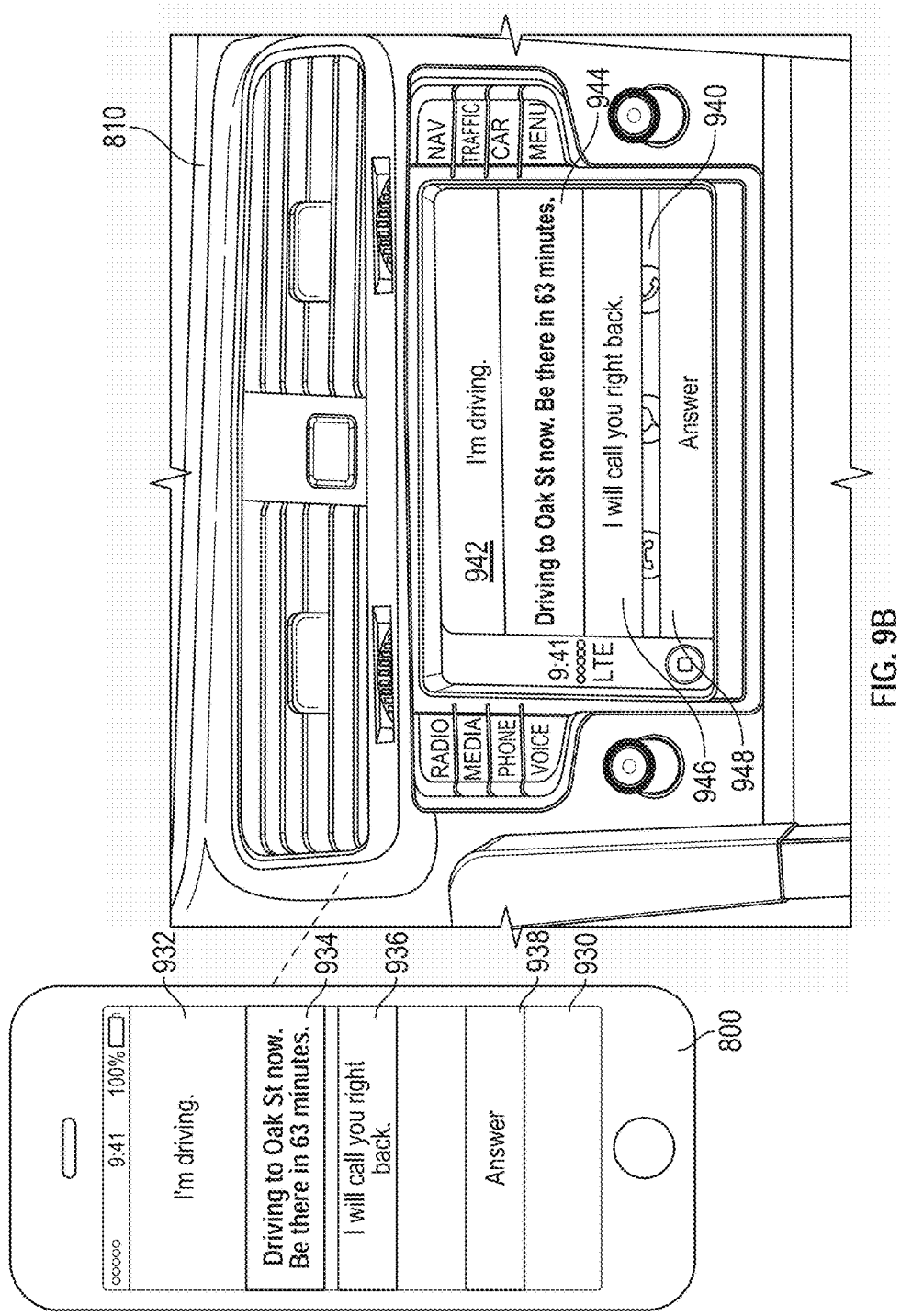

With reference to FIGS. 9A-9D, in some embodiments, device 800 can intelligently decline an incoming call based on the identity of the caller. As shown in FIG. 9A, device 800 receives a call and can determine the identity of the caller (e.g., the user's boss). The determination of the caller's identity can be based on information associated with the incoming call (e.g., the number of the incoming call) and a correlation between the information and the user's contact list or other appropriate data sources. In some examples, the determination of the caller's identity can be based on the source or area code of the call. For example, the number of the incoming call may not correlate to any number in the user's contract list, but may be a number that has the same area code as the user's family members or co-workers. Under these circumstances, device 800 can determine that the user's family member, friends, or colleagues may be calling. It is appreciated that device 800 can determine the caller's identity using any available data sources.

In some examples, after receiving the call, device 800 can provide a voice output (e.g., "Your boss is calling, do you want to take the call?") informing the user the caller's identity. Similar to those described above, device 800 and/or electronic device 810 can display user interfaces 910 and/or 920 providing one or more affordances (affordances 912, 914, 916, 918, 922, 924, and 926) representing options for responding to the incoming call.

With reference to FIG. 9B, in some examples, after determining the caller's identity, device 800 can provide an alternative or additional response option based on the identity of the caller. Using the examples described above with respect to FIGS. 8D-8E, a response option (e.g., "Be home in 1 hour, 12 minutes.") that is appropriate for one caller (e.g., the user's wife) may not appropriate for another caller (e.g., the user's boss). Thus, as shown in FIG. 9B, instead of providing an affordance representing the response option "Be home in 1 hour, 12 minutes," device 800 can provide affordances 936 representing an alternative response option such as "I will call you right back," which is a more appropriate option for the user's boss. Device 800 can cause electronic device 810 to provide an affordance 946 representing a similar response option.

Figure 9C:
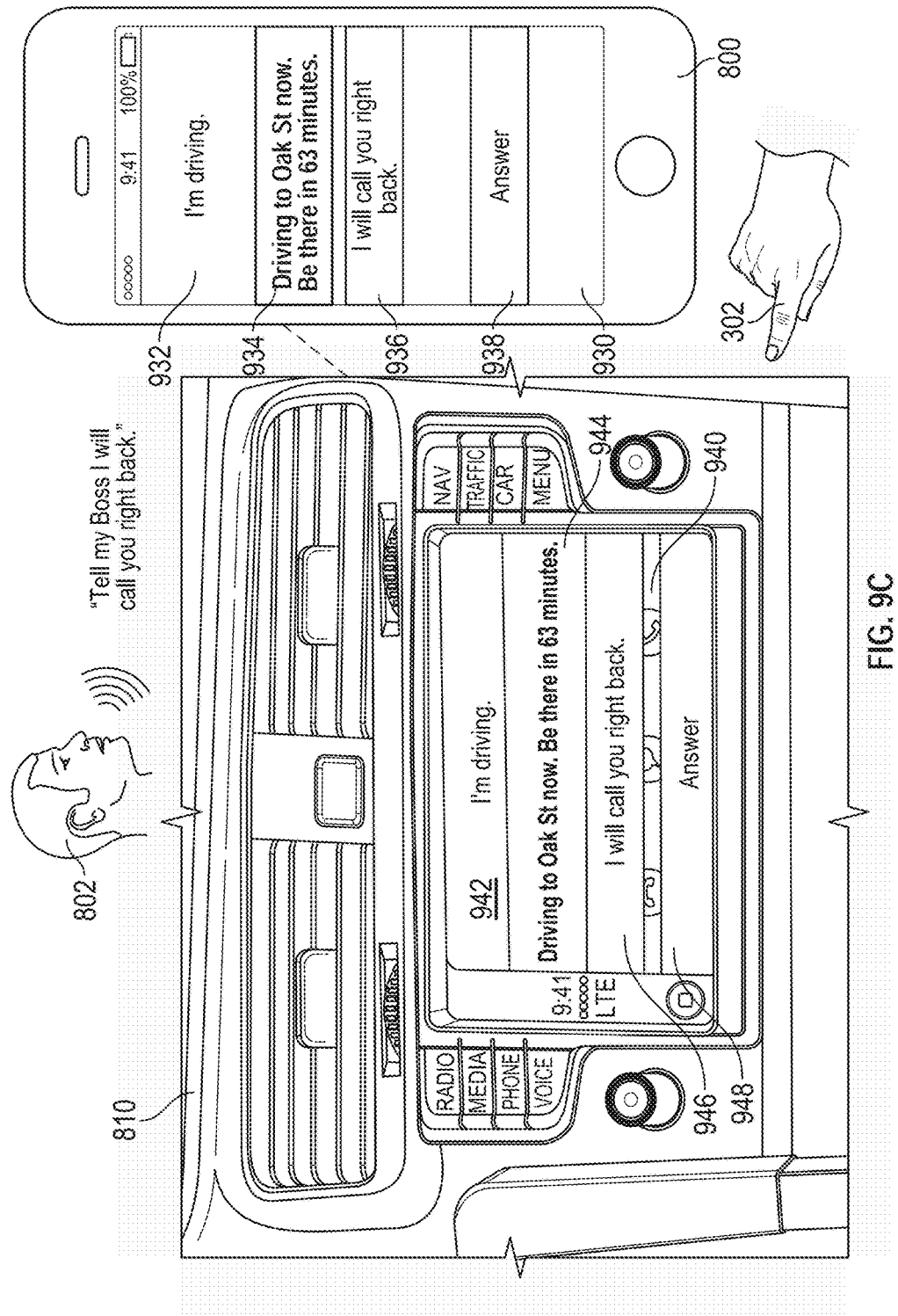

With references to FIGS. 9C and 9D, similar to those describe above, device 800 and/or electronic device 810 can receive the user's selection of a response option from the plurality of response options. For example, device 800 can receive a touch input selecting affordance 936 representing the response option "I will call you right back." Device 800 can also receive a voice input from user 802 such as "tell my boss I will call you right back." Similar to those described above, device 800 can decline the call based on the selected response option. For example, device 800 can send a text message, a voice message, a map location, a copy of the user's calendar, a device status, etc. to the caller. As shown in FIG. 9D, after declining the call, device 800 can provide a confirmation such as "message sent to your boss: 'I will call you right back.'"

5. Process for Intelligent Declining of an Incoming Call.

Figure 10A:
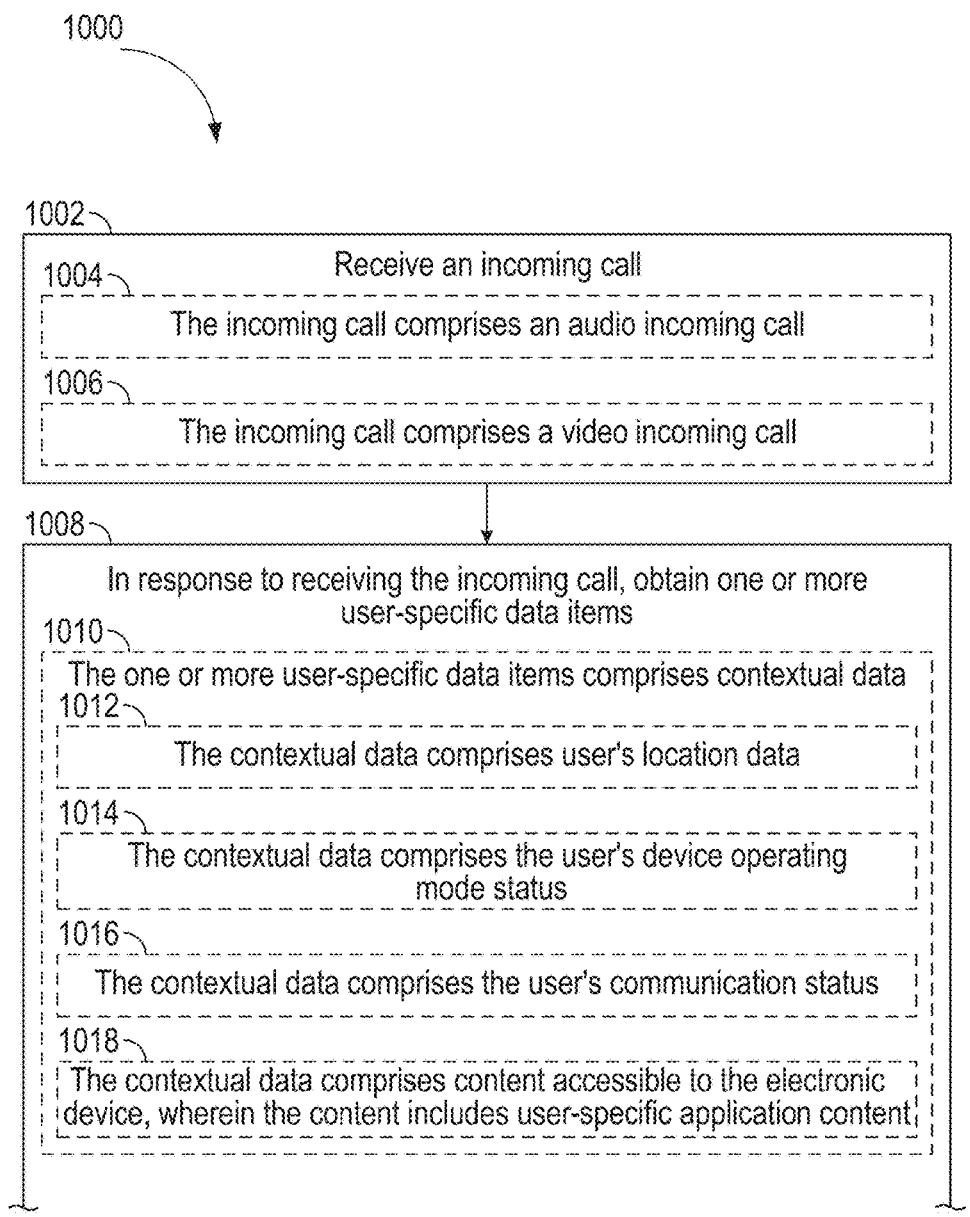
FIGS. 10A-10E illustrate a flow diagram of an exemplary process for operating a digital assistant according to various examples.
Figure 10B:
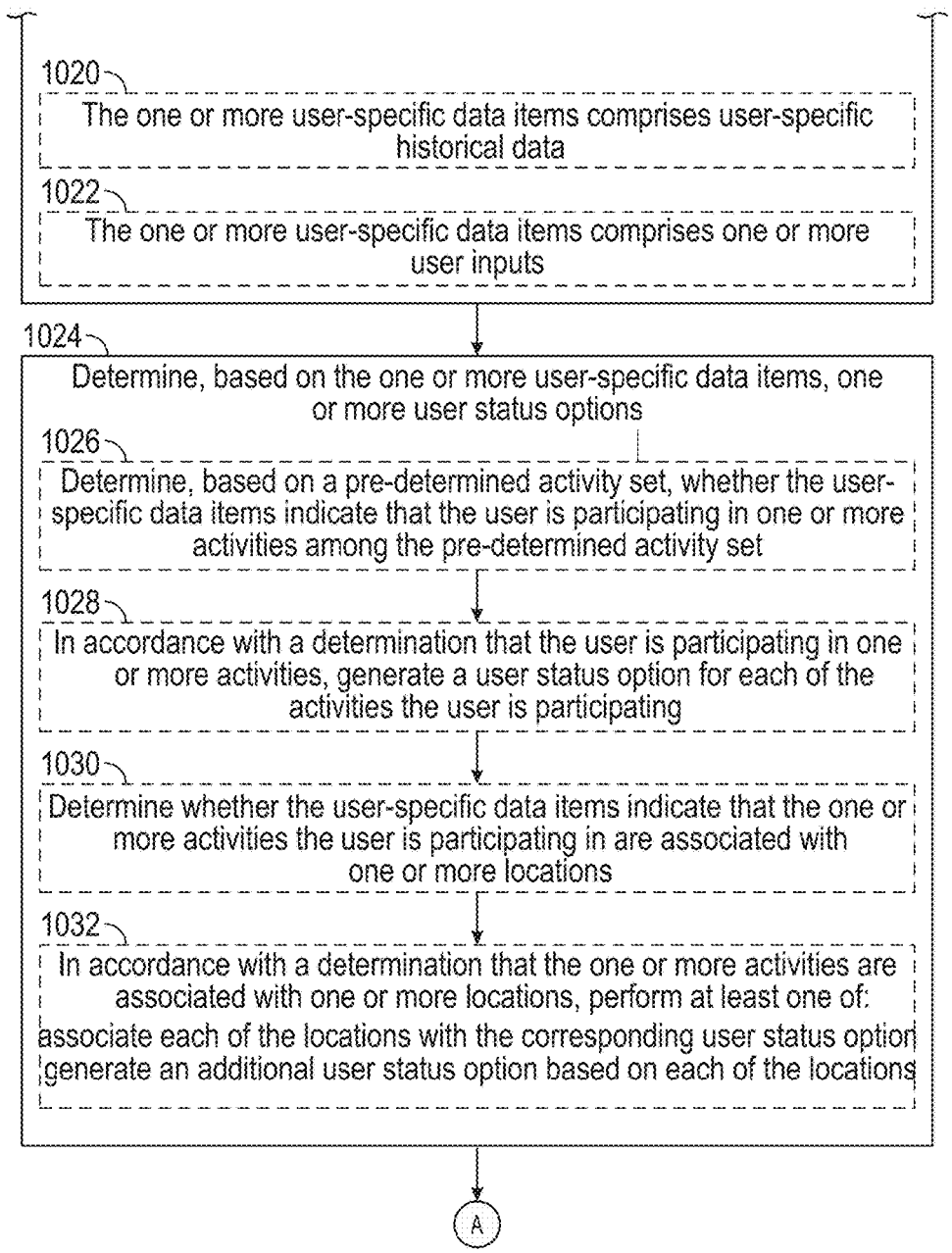

FIGS. 10A-10B illustrate a flow diagram of an exemplary process 1000 for operating a digital assistant according to various examples. Process 1000 may be performed using one or more devices 104, 108, 200, 400, 600, 800, or 810, (FIG. 1, 2A, 4, 6A-6B, 8A-8F, or 9A-9D). Operations in process 1000 are, optionally, combined or split and/or the order of some operations is, optionally, changed.

With reference to FIG. 10A, at block 1002, an incoming call is received. At block 1004, the incoming call comprises an audio incoming call. At block 1006, the incoming call comprises a video incoming call.

At block 1008, in response to receiving the incoming call, one or more user-specific data items are obtained. At block 1010, the one or more user-specific data items comprise contextual data. At block 1012, the contextual data comprises user's location data (e.g., the user's current location, the user's destination location, the caller's location). At block 1014, the contextual data comprises the user's device operating mode status (e.g., "do not disturb," "silent," "airplane," and "airplay"). At block 1016, the contextual data comprises the user's communication status (e.g., the user is participating in another call, device 800 is connected to another electronic device). At block 1018, the contextual data comprises content accessible to the electronic device. The content includes user-specific application content, such as the user's calendar data, user's contact list, user's contact's location data (e.g. the caller's current and destination location data), user's note, emails, text messages, voicemails, saved locations, social media posts, and/or application settings.

With reference to FIG. 10B, at block 1020, the one or more user-specific data items comprise user-specific historical data (e.g., the user's historical commute data, the user's routine activities, the user-specific preferences). At block 1022, the one or more user-specific data items comprise one or more user inputs (e.g., voice inputs).

At block 1024, one or more user status options are determined based on the one or more user-specific data items. At block 1026, to determine the user status options, it is determined, based on a pre-determined activity set, whether the user-specific data items indicate that the user is participating in one or more activities among the pre-determined activity set. At block 1028, in accordance with a determination that the user is participating in one or more activities, a user status option for each of the activities the user is participating in is generated. At block 1030, it is determined whether the user-specific data items indicate that the one or more activities the user is participating in are associated with one or more locations. At block 1032, in accordance with a determination that the one or more activities are associated with one or more locations, at least one of the following is performed: associating each of the locations with the corresponding user status option; and generating an additional user status option based on each of the locations.

Figure 10C:
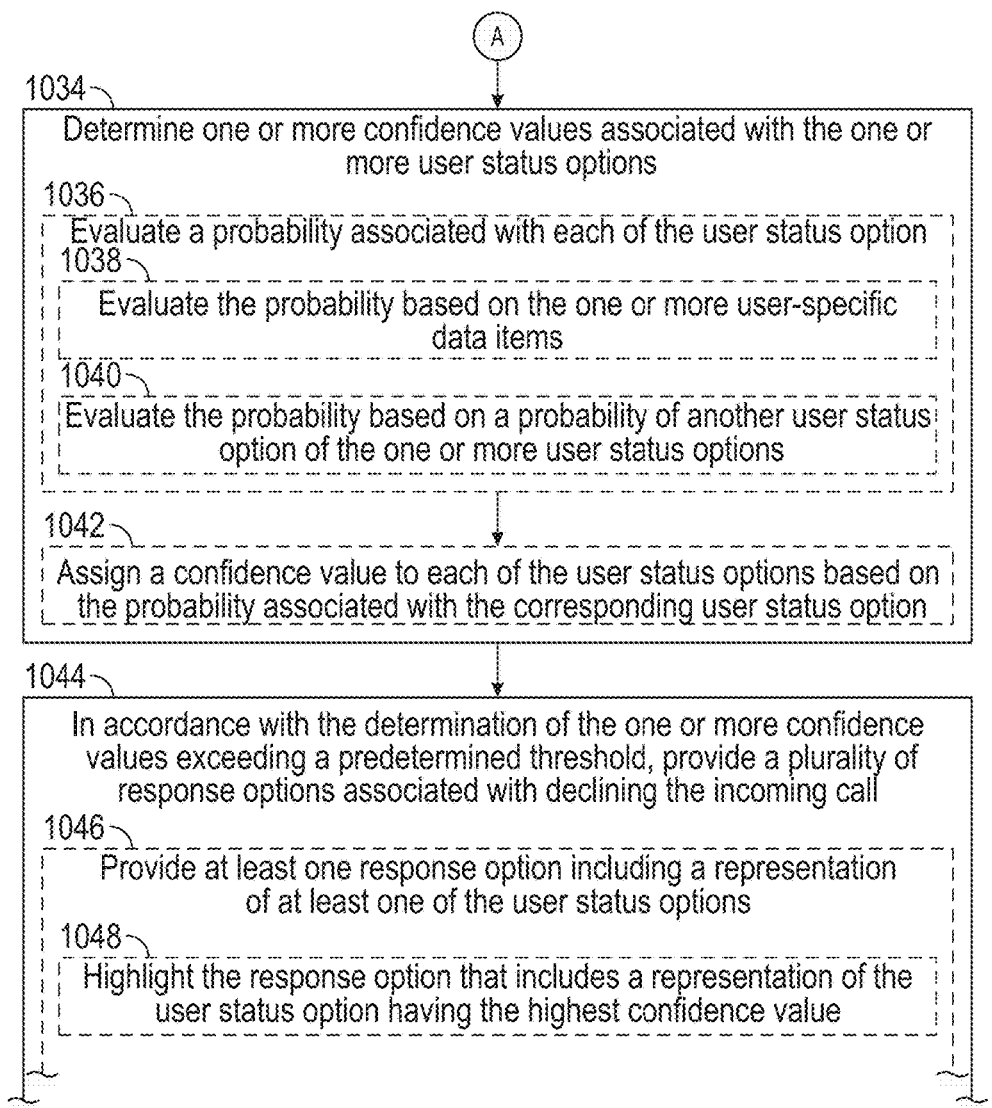

With reference to FIG. 10C, at block 1034, one or more confidence values associated with the one or more user status options are determined. At block 1036, to determine the confidence values, a probability associated with each of the user status option is evaluated. At block 1038, to evaluate the probability associated with each of the user status option, the probability is evaluated based on the one or more user-specific data items. At block 1040, the probability is evaluated based on a probability of another user status option of the one or more user status options. At block 1042, a confidence value is assigned to each of the user status options based on the probability associated with the corresponding user status option.

At block 1044, in accordance with the determination of the one or more confidence values exceeding a predetermined threshold, a plurality of response options associated with declining the incoming call are provided. At block 1046, at least one response option including a representation of at least one of the user status options is provided. At block 1048, it is highlighted the response option that includes a representation of the user status option having the highest confidence value.

Figure 10D:
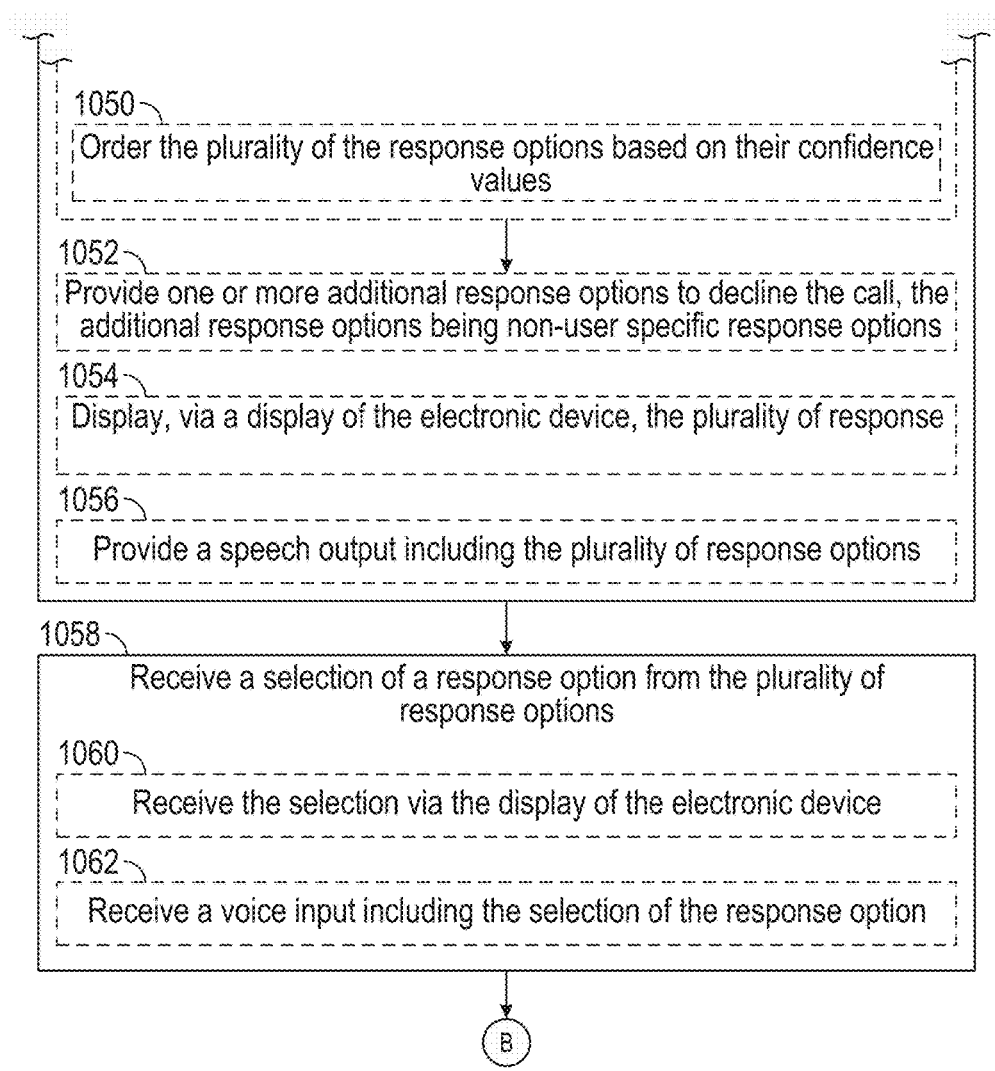

With reference to FIG. 10D, at block 1050, the plurality of the response options are ordered based on their confidence values. At block 1052, one or more additional response options are provided to decline the call. The additional response options are non-user specific response options. At block 1054, it is displayed, via a display of the electronic device, the plurality of response options associated with declining the call request. At block 1056, a speech output including the plurality of response options is provided.

At block 1058, a selection of a response option from the plurality of response options is received. At block 1060, the selection is received via the display of the electronic device. At block 1062, a voice input including the selection of the response option is received.

Figure 10E:
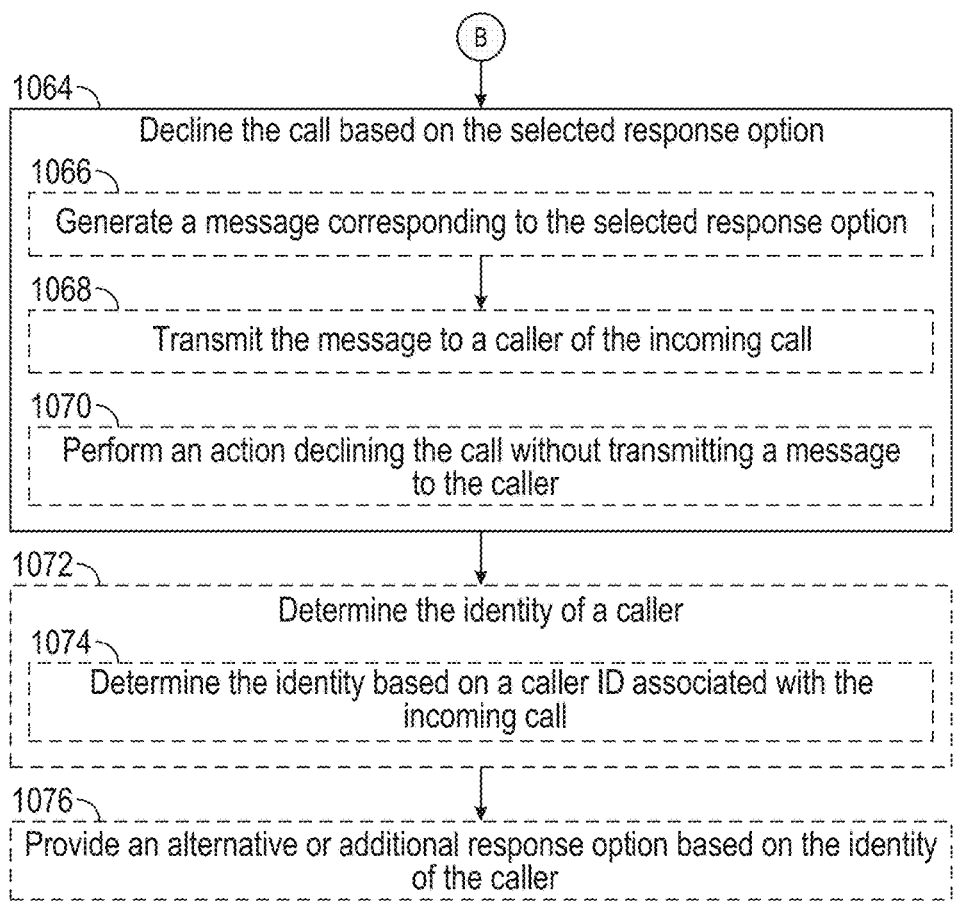

With reference to FIG. 10E, at block 1064, the call is declined based on the selected response option. At block 1066, in declining the call, a message is generated corresponding to the selected response option. At block 1068, the message is transmitted to a caller of the incoming call. At block 1070, in another embodiment, an action declining the call is performed without transmitting a message to the caller.

At block 1072, the identity of a caller is determined. At block 1074, the identity is determined based on a caller ID associated with the incoming call. At block 1076, an alternative or additional response option is provided based on the identity of the caller.

6. Electronic Device

Figure 11:
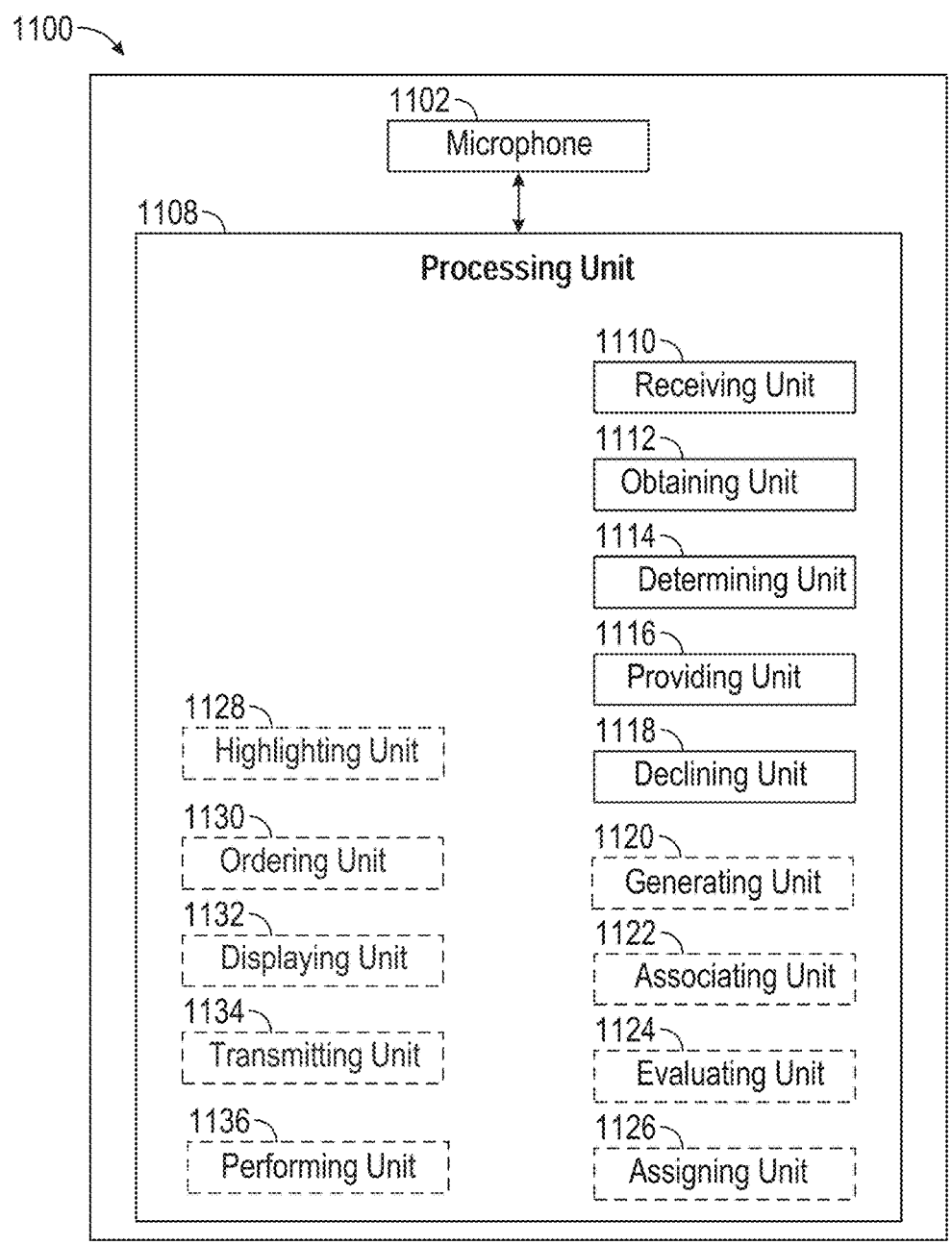
FIG. 11 illustrates a block diagram of an electronic device according to various examples.

FIG. 11 shows a functional block diagram of electronic device 1100 configured in accordance with the principles of the various described examples, including those described with reference to FIGS. 8A-8F and 9A-9D. The functional blocks of the device can be optionally implemented by hardware, software, or a combination of hardware and software to carry out the principles of the various described examples. It is understood by persons of skill in the art that the functional blocks described in FIG. 11 can be optionally combined or separated into sub-blocks to implement the principles of the various described examples. Therefore, the description herein optionally supports any possible combination, separation, or further definition of the functional blocks described herein.

As shown in FIG. 11, electronic device 1100 can include a microphone 1102 and processing unit 1108. In some examples, processing unit 1108 includes a receiving unit 1110, an obtaining unit 1112, a determining unit 1114, a providing unit 1116, a declining unit 1118, and optionally, a generating unit 1120, an associating unit 1122, an evaluating unit 1124, an assigning unit 1126, a highlighting unit 1128, an ordering unit 1130, a displaying unit 1132, a transmitting unit 1134, and a performing unit 1136.

In some examples, the processing unit 1108 is configured to receive (e.g., with receiving unit 1110) an incoming call. In response to receiving the incoming call, the processing unit 1108 is configured to obtain (e.g., with obtaining unit 1112) one or more user-specific data items. The processing unit 1108 is further configured to determine (e.g., with determining unit 1114), based on the one or more user-specific data items, one or more user status options; and determine (e.g., with determining unit 1114) one or more confidence values associated with the one or more user status options. In some examples, in accordance with the determination of the one or more confidence values exceeding a predetermined threshold, the processing unit 1108 is configured to provide (e.g., with providing unit 1116) a plurality of response options associated with declining the incoming call; receive (e.g., with receiving unit 1110) a selection of a response option from the plurality of response options; and decline (e.g., with declining unit 1118) the call based on the selected response option.

In some examples, the incoming call comprises an audio incoming call and/or a video incoming call. In some examples, one or more user-specific data items comprise contextual data. In some examples, the contextual data comprises at least one of: user's location data, the user's device operating mode status, the user's communication status, and content accessible to the electronic device. The content includes user-specific application content.

In some examples, the one or more user-specific data items comprise user-specific historical data. In some examples, the one or more user-specific data items comprise one or more user inputs.

In some examples, in determining one or more user status options, the processing unit 1108 is further configured to determine (e.g., with the determining unit 1114), based on a pre-determined activity set, whether the user-specific data items indicate that the user is participating in one or more activities among the pre-determined activity set.

In some examples, in accordance with a determination that the user is participating in one or more activities, the processing unit 1108 is further configured to generate (e.g., with the generating unit 1120) a user status option for each of the activities the user is participating in.

In some examples, the processing unit 1108 is further configured to determine (e.g., with the determining unit 1114) whether the user-specific data items indicate that the one or more activities the user is participating in are associated with one or more locations. In accordance with a determination that the one or more activities are associated with one or more locations, the processing unit 1108 is further configured to perform (e.g., with the performing unit 1136) at least one of: associating (e.g., with an associating unit 1122) each of the locations with the corresponding user status option; and generating (e.g., with an generating unit 1120) an additional user status option based on each of the locations.

In some examples, in determining one or more confidence values associated with the one or more user status options, the processing unit 1108 is further configured to evaluate (e.g., with the evaluating unit 1124) a probability associated with each of the user status option; and assign (e.g., with assigning unit 1126) a confidence value to each of the user status options based on the probability associated with the corresponding user status option.

In some examples, in evaluating the probability associated with each of the user status options, the processing unit 1108 is further configured to evaluate (e.g., with the evaluating unit 1124) the probability based on the one or more user-specific data items.

In some examples, in evaluating the probability associated with each of the user status option, the processing unit 1108 is further configured to evaluate (e.g., with the evaluating unit 1124) the probability based on a probability of another user status option of the one or more user status options.

In some examples, in providing a plurality of response options associated with declining the call request, the processing unit 1108 is further configured to provide (e.g., with the providing unit 1116) at least one response option including a representation of at least one of the user status options.

In some examples, in providing at least one response option including a representation of at least one of the user status options, the processing unit 1108 is further configured to highlight (e.g., with the highlighting unit 1128) the response option that includes a representation of the user status option having the highest confidence value.

In some examples, in providing at least one response option including a representation of at least one of the user status options, the processing unit 1108 is further configured to order (e.g., with the ordering unit 1130) the plurality of the response options based on their confidence values.

In some examples, the processing unit 1108 is further configured to provide (e.g., with the providing unit 1116) one or more additional response options to decline the call. The additional response options are non-user specific response options.

In some examples, in providing a plurality of response options associated with declining the call request, the processing unit 1108 is further configured to display (e.g., with the displaying unit 1132), via a display of the electronic device, the plurality of response options associated with declining the call request.

In some examples, in providing a plurality of response options associated with declining the call request, the processing unit 1108 is further configured to provide (e.g., with the providing unit 1116) a speech output including the plurality of response options.

In some examples, in receiving the selection of a response option from the plurality of response options, the processing unit 1108 is further configured to receive (e.g., with the receiving unit 1110) the selection via the display of the electronic device.

In some examples, in receiving the selection of a response option from the plurality of response options, the processing unit 1108 is further configured to receive (e.g., with the receiving unit 1110) a voice input including the selection of the response option.

In some examples, in declining the call based on the selected response option, the processing unit 1108 is further configured to generate (e.g., with the generating unit 1120) a message corresponding to the selected response option; and transmit (e.g., with transmitting unit 1134) the message to a caller of the incoming call.

In some examples, the message comprises at least one of: a text message, a voice message, a map location of the user, a copy of the user's calendar, and a device status.

In some examples, in declining the call based on the selected response option, the processing unit 1108 is further configured to perform (e.g., with the performing unit 1136) an action declining the call without transmitting a message to the caller.

In some examples, the processing unit 1108 is further configured to determine (e.g., with the determining unit 1114) the identity of a caller; and provide (e.g., with the providing unit 1116) an alternative or additional response option based on the identity of the caller.

In some examples, in determining the identity of the caller, the processing unit 1108 is further configured to determine (e.g., with the determining unit 1114) the identity based on a caller ID associated with the incoming call.

The operation described above with respect to FIG. 11 is, optionally, implemented by components depicted in FIG. 1, 2A, 4, 6A-6B, 7A-7B, 8A-8F, or 9A-9D. For example, operations of receiving unit 1110, determining unit 1114, generating unit 1120, and performing unit 1136 are optionally implemented by processor(s) 220. It would be clear to a person of ordinary skill in the art how other processes can be implemented based on the components depicted in FIG. 1, 2A, 4, 6A-6B, 7A-7B, 8A-8F, or 9A-9D.

It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein. For example, processing unit 1108 can have an associated "controller" unit that is operatively coupled with processing unit 1108 to enable operation. This controller unit is not separately illustrated in FIG. 11 but is understood to be within the grasp of one of ordinary skill in the art who is designing a device having a processing unit 1108, such as device 1100. As another example, one or more units, such as the receiving unit 1110, may be hardware units outside of processing unit 1108 in some embodiments. The description herein thus optionally supports combination, separation, and/or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device comprising:
one or more processors;
memory; and
one or more programs stored in memory, the one or more programs including instructions for:
receiving an incoming call;
in response to receiving the incoming call, obtaining one or more user-specific data items;
determining, based on the one or more user-specific data items, a plurality of user status options;
determining a plurality of confidence values associated with the plurality of user status options;
in accordance with the determination of the plurality of confidence values exceeding a predetermined threshold, providing a plurality of response options associated with declining the incoming call, wherein providing the plurality of response options includes:
providing at least one response option including a representation of at least one of the user status options,
determining two or more highest confidence values associated with two or more corresponding user status options of the plurality of user status options,
determining whether the two or more highest confidence values associated with the two or more user status options are within a predefined range, and
in accordance with a determination that the two or more highest confidence values associated with the two or more user status options are within the predefined range, highlighting a response option of the two or more response options corresponding to the two or more user status options that are associated with the two or more highest confidence values, wherein the highlighted response option is more informative than other response options;
receiving a selection of a response option from the plurality of response options; and
declining the call based on the selected response option.

2. The electronic device of claim 1, wherein the incoming call comprises at least one of: an audio incoming call and a video incoming call.

3. The electronic device of claim 1, wherein the one or more user-specific data items comprise at least one of: contextual data, user-specific historical data, and one or more user inputs.

4. The electronic device of claim 3, wherein the contextual data comprises at least one of: user's location data, user's device operating mode status, user's communication status, and content accessible to the electronic device, wherein the content includes user-specific application content.

5. The electronic device of claim 1, wherein determining, based on the one or more user-specific data items, the plurality of user status options comprises:
determining, based on a pre-determined activity set, whether the user-specific data items indicate that the user is participating in one or more activities among the pre-determined activity set; and
in accordance with a determination that the user is participating in one or more activities, generating a user status option for each of the activities the user is participating in.

6. The electronic device of claim 5, further comprising:
determining whether the user-specific data items indicate that the one or more activities the user is participating in are associated with one or more locations; and in accordance with a determination that the one or more activities are associated with one or more locations, performing at least one of:
associating each of the locations with the corresponding user status option; and
generating an additional user status option based on each of the locations.

7. The electronic device of claim 1, wherein determining the plurality of confidence values associated with the plurality of user status options comprises:
evaluating a probability associated with each of the user status option; and
assigning a confidence value to each of the user status options based on the probability associated with the corresponding user status option.

8. The electronic device of claim 7, wherein evaluating the probability associated with each of the user status option comprises evaluating the probability based on the one or more user-specific data items.

9. The electronic device of claim 7, wherein evaluating the probability associated with each of the user status option comprises evaluating the probability based on a probability of another user status option of the one or more user status options.

10. The electronic device of claim 1, wherein providing at least one response option including a representation of at least one of the user status options comprises:
ordering the plurality of the response options based on their confidence values.

11. The electronic device of claim 1, further comprising:
providing one or more additional response options to decline the call, the additional response options being non-user specific response options.

12. The electronic device of claim 1, wherein providing a plurality of response options associated with declining the call request comprises:
displaying, via a display of the electronic device, the plurality of response options associated with declining the call request.

13. The electronic device of claim 1, wherein providing a plurality of response options associated with declining the call request comprises:
providing a speech output including the plurality of response options.

14. The electronic device of claim 1, wherein receiving the selection of a response option from the plurality of response options comprises receiving the selection via a display of the electronic device.

15. The electronic device of claim 1, wherein receiving the selection of a response option from the plurality of response options comprises receiving a voice input including the selection of the response option.

16. The electronic device of claim 1, wherein declining the call based on the selected response option comprises:
generating a message corresponding to the selected response option;
and transmitting the message to a caller of the incoming call.

17. The electronic device of claim 16, wherein the message comprises at least one of: a text message and a voice message.

18. The electronic device of claim 16, wherein the message comprises at least one of: a map location of the user, a copy of the user's calendar, and a device status.

19. The electronic device of claim 1, wherein declining the call based on the selected response option comprises:
performing an action declining the call without transmitting a message to a caller.

20. The electronic device of claim 1, further comprising:
determining an identity of a caller; and
providing an alternative or additional response option based on the identity of the caller.

21. A method comprising:
at an electronic device with one or more processors and memory:
receiving an incoming call;
in response to receiving the incoming call, obtaining one or more user-specific data items;
determining, based on the one or more user-specific data items, a plurality of user status options;
determining a plurality of confidence values associated with the plurality of user status options;
in accordance with the determination of the plurality of confidence values exceeding a predetermined threshold, providing a plurality of response options associated with declining the incoming call, wherein providing the plurality of response options includes:
providing at least one response option including a representation of at least one of the user status options,
determining two or more highest confidence values associated with two or more corresponding user status options of the plurality of user status options,
determining whether the two or more highest confidence values associated with the two or more user status options are within a predefined range, and
in accordance with a determination that the two or more highest confidence values associated with the two or more user status options are within the predefined range, highlighting a response option of the two or more response options corresponding to the two or more user status options that are associated with the two or more highest confidence values, wherein the highlighted response option is more informative than other response options;
receiving a selection of a response option from the plurality of response options; and
declining the call based on the selected response option.

22. The method of claim 21, wherein the one or more user-specific data items comprise at least one of: contextual data, user-specific historical data, and one or more user inputs.

23. The method of claim 22, wherein the contextual data comprises at least one of: user's location data, user's device operating mode status, user's communication status, and content accessible to the electronic device, wherein the content includes user-specific application content.

24. The method of claim 21, wherein determining, based on the one or more user-specific data items, the plurality of user status options comprises:
determining, based on a pre-determined activity set, whether the user-specific data items indicate that the user is participating in one or more activities among the pre-determined activity set; and
in accordance with a determination that the user is participating in one or more activities, generating a user status option for each of the activities the user is participating in.

25. The method of claim 24, further comprising:
determining whether the user-specific data items indicate that the one or more activities the user is participating in are associated with one or more locations; and
in accordance with a determination that the one or more activities are associated with one or more locations, performing at least one of:
associating each of the locations with the corresponding user status option; and
generating an additional user status option based on each of the locations.

26. The method of claim 21, wherein determining the plurality of confidence values associated with the plurality of user status options comprises:
evaluating a probability associated with each of the user status option; and
assigning a confidence value to each of the user status options based on the probability associated with the corresponding user status option.

27. The method of claim 26, wherein evaluating the probability associated with each of the user status option comprises evaluating the probability based on the one or more user-specific data items.

28. The method of claim 26, wherein evaluating the probability associated with each of the user status option comprises evaluating the probability based on a probability of another user status option of the one or more user status options.

29. The method of claim 21, wherein providing at least one response option including a representation of at least one of the user status options comprises:
ordering the plurality of the response options based on their confidence values.

30. The method of claim 21, wherein receiving the selection of a response option from the plurality of response options comprises receiving the selection via a display of the electronic device.

31. The method of claim 21, wherein receiving the selection of a response option from the plurality of response options comprises receiving a voice input including the selection of the response option.

32. The method of claim 21, wherein declining the call based on the selected response option comprises:
generating a message corresponding to the selected response option; and
transmitting the message to a caller of the incoming call.

33. The method of claim 32, wherein the message comprises at least one of: a map location of the user, a copy of the user's calendar, and a device status.

34. The method of claim 21, further comprising:
determining an identity of a caller; and
providing an alternative or additional response option based on the identity of the caller.

35. A non-transitory computer-readable storage medium comprising one or more programs for execution by one or more processors of an electronic device, the one or more programs including instructions which, when executed by the one or more processors, cause the electronic device to:
receive an incoming call;
in response to receiving the incoming call, obtain one or more user-specific data items;
determine, based on the one or more user-specific data items, a plurality of user status options;
determine a plurality of confidence values associated with the plurality of user status options;
in accordance with the determination of the plurality of confidence values exceeding a predetermined threshold, provide a plurality of response options associated with declining the incoming call, wherein providing the plurality of response options includes:
providing at least one response option including a representation of at least one of the user status options, and
determining two or more highest confidence values associated with two or more corresponding user status options of the plurality of user status options,
determining whether the two or more highest confidence values associated with the two or more user status options are within a predefined range, and
in accordance with a determination that the two or more highest confidence values associated with the two or more user status options are within the predefined range, highlighting a response option of the two or more response options corresponding to the two or more user status options that are associated with the two or more highest confidence values, wherein the highlighted response option is more informative than other response options;
receive a selection of a response option from the plurality of response options; and
decline the call based on the selected response option.

36. The non-transitory computer-readable storage medium of claim 35, wherein the one or more user-specific data items comprise at least one of: contextual data, user-specific historical data, and one or more user inputs.

37. The non-transitory computer-readable storage medium of claim 36, wherein the contextual data comprises at least one of: user's location data, user's device operating mode status, user's communication status, and content accessible to the electronic device, wherein the content includes user-specific application content.

38. The non-transitory computer-readable storage medium of claim 8, wherein determining, based on the one or more user-specific data items, the plurality of user status options comprises:
determining, based on a pre-determined activity set, whether the user-specific data items indicate that the user is participating in one or more activities among the pre-determined activity set; and
in accordance with a determination that the user is participating in one or more activities, generating a user status option for each of the activities the user is participating in.

39. The non-transitory computer-readable storage medium of claim 38, wherein the one or more programs further comprising instructions which cause the electronic device to:
determine whether the user-specific data items indicate that the one or more activities the user is participating in are associated with one or more locations; and
in accordance with a determination that the one or more activities are associated with one or more locations, performing at least one of:
associate each of the locations with the corresponding user status option; and
generate an additional user status option based on each of the locations.

40. The non-transitory computer-readable storage medium of claim 35, wherein determining the plurality of confidence values associated with the plurality of user status options comprises:
evaluating a probability associated with each of the user status option; and assigning a confidence value to each of the user status options based on the probability associated with the corresponding user status option.

41. The non-transitory computer-readable storage medium of claim 40, wherein evaluating the probability associated with each of the user status option comprises evaluating the probability based on the one or more user-specific data items.

42. The non-transitory computer-readable storage medium of claim 40, wherein evaluating the probability associated with each of the user status option comprises evaluating the probability based on a probability of another user status option of the one or more user status options.

43. The non-transitory computer-readable storage medium of claim 8, wherein providing at least one response option including a representation of at least one of the user status options comprises:
ordering the plurality of the response options based on their confidence values.

44. The non-transitory computer-readable storage medium of claim 8, wherein receiving the selection of a response option from the plurality of response options comprises receiving the selection via a display of the electronic device.

45. The non-transitory computer-readable storage medium of claim 8, wherein receiving the selection of a response option from the plurality of response options comprises receiving a voice input including the selection of the response option.

46. The non-transitory computer-readable storage medium of claim 35, wherein declining the call based on the selected response option comprises:
generating a message corresponding to the selected response option; and
transmitting the message to a caller of the incoming call.

47. The non-transitory computer-readable storage medium of claim 46, wherein the message comprises at least one of: a map location of the user, a copy of the user's calendar, and a device status.

48. The non-transitory computer-readable storage medium of claim 8, wherein the one or more programs further comprising instructions which cause the electronic device to:
determine an identity of a caller; and
provide an alternative or additional response option based on the identity of the caller.

* * * * *

UNITED STATES PATENT AND TRADEMARK OFFICE
CERTIFICATE OF CORRECTION

PATENT NO. : 10,230,841 B2
APPLICATION NO. : 15/789570
DATED : March 12, 2019
INVENTOR(S) : Keith W. Rauenbuehler et al.

Page 1 of 1

It is certified that error appears in the above-identified patent and that said Letters Patent is hereby corrected as shown below:

In Column 60, Line 37, Claim 38, delete "8," and insert -- 35, --, therefor.

In Column 61, Line 15, Claim 43, delete "8," and insert -- 35, --, therefor.

In Column 61, Line 21, Claim 44, delete "8," and insert -- 35, --, therefor.

In Column 62, Line 2, Claim 45, delete "8," and insert -- 35, --, therefor.

In Column 62, Line 17, Claim 48, delete "8," and insert -- 35, --, therefor.

Signed and Sealed this
Ninth Day of July, 2019

Andrei Iancu
*Director of the United States Patent and Trademark Office*